(12) United States Patent
Liang et al.

(10) Patent No.: US 10,237,878 B2
(45) Date of Patent: Mar. 19, 2019

(54) METHOD FOR ALLOCATING MULTIPLE COMPONENT CARRIERS, BASE STATION, AND USER EQUIPMENT

(71) Applicant: HUAWEI TECHNOLOGIES CO., LTD., Shenzhen, Guangdong (CN)

(72) Inventors: Yongming Liang, Shanghai (CN); Peng Li, Shenzhen (CN); Lei Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 15/594,918

(22) Filed: May 15, 2017

(65) Prior Publication Data
US 2017/0251480 A1    Aug. 31, 2017

Related U.S. Application Data

(63) Continuation of application No. PCT/CN2014/092538, filed on Nov. 28, 2014.

(51) Int. Cl.
*H04W 72/08* (2009.01)
*H04W 48/00* (2009.01)
(Continued)

(52) U.S. Cl.
CPC ............. *H04W 72/08* (2013.01); *H04L 5/00* (2013.01); *H04L 29/08306* (2013.01);
(Continued)

(58) Field of Classification Search
CPC ........ H04W 72/04; H04W 72/08; H04L 12/26
See application file for complete search history.

(56) References Cited

U.S. PATENT DOCUMENTS

2009/0163208 A1    6/2009  Rao
2010/0177649 A1*   7/2010  Ishii ................ H04L 1/1812
                                            370/252
2013/0143503 A1    6/2013  Li et al.

FOREIGN PATENT DOCUMENTS

CN    101904199 A    12/2010
CN    102215503 A    10/2011
(Continued)

OTHER PUBLICATIONS

ZTE: "Discussion on LTE in Unlicensed Spectrum," 3GPP Draft: RWS-140021, Discussion on LTE in Unlicensed Spectrum, 3$^{rd}$ Generation Partnership Project (3GPP), Mobile Competence Centre; 650 , Route Des Lucioles; F-06921 Sophia Antipolis Cedex, France, Jun. 6, 2014 XP050774767.
(Continued)

*Primary Examiner* — Myron Wyche
(74) *Attorney, Agent, or Firm* — Staas & Halsey LLP

(57) ABSTRACT

The present disclosure provides a method to provide signaling support in a hotspot area or a crowded occasion, so as to reduce costs of deploying, by the telecommunications operators, base stations and backhauls. A specific implementation method is: receiving, by a high frequency base station, measurement information sent by low and medium frequency base stations of multiple telecommunications operators or measurement reports sent by first user equipments of multiple telecommunications operators, where the high frequency base station works in a high frequency band, the low and medium frequency base stations work in a low and medium frequency band, and the first user equipments are served by the high frequency base station; allocating, by the high frequency base station, multiple component carriers comprised in high frequency resources to the low and
(Continued)

medium frequency base stations according to the measurement information, to obtain an allocation result.

26 Claims, 16 Drawing Sheets

(51) Int. Cl.
| | |
|---|---|
| *H04W 68/00* | (2009.01) |
| *H04W 72/04* | (2009.01) |
| *H04W 4/70* | (2018.01) |
| *H04L 29/08* | (2006.01) |
| *H04W 16/28* | (2009.01) |
| *H04W 84/02* | (2009.01) |
| *H04W 92/18* | (2009.01) |
| *H04L 5/00* | (2006.01) |
| *H04W 76/15* | (2018.01) |
| *H04W 28/08* | (2009.01) |
| *H04W 92/20* | (2009.01) |

(52) U.S. Cl.
CPC ......... *H04L 29/08954* (2013.01); *H04W 4/70* (2018.02); *H04W 16/28* (2013.01); *H04W 48/00* (2013.01); *H04W 68/00* (2013.01); *H04W 72/0486* (2013.01); *H04W 76/15* (2018.02); *H04W 84/02* (2013.01); *H04W 92/18* (2013.01); *H04W 28/08* (2013.01); *H04W 72/085* (2013.01); *H04W 92/20* (2013.01)

(56) References Cited

FOREIGN PATENT DOCUMENTS

| CN | 102802243 A | 11/2012 | | |
|---|---|---|---|---|
| CN | 103975539 A | 8/2014 | | |
| WO | 2013/179095 A1 | 12/2013 | | |
| WO | WO/2013/179-95 | * 12/2013 | ............ | H04W 72/04 |
| WO | 2014/176503 A1 | 10/2014 | | |

OTHER PUBLICATIONS

Extended European Search Report dated Sep. 27, 2017 in corresponding European Patent Application No. 14906666.4.
International Search Report dated Aug. 26, 2015 in corresponding International Application No. PCT/CN2014/092538.
International Search Report dated Aug. 26, 2015 in corresponding to International Application PCT/CN2014/092538.
3GPP TS 36.321 V12.3.0; $3^{rd}$ Generation Partnership Project; Technical Specification Group Radio Access Network; Evolved Universal Terrestrial Radio Access (E-UTRA), "Medium Access Control (MAC) protocol specification (Release 12)," Sophia Antipolis, France, Sep. 2014.
3GPP TS 36.331 V12.3.0; $3^{rd}$ Generation Partnership Project; Technical Specification Group Radio Access Network; Evolved Universal Terrestrial Radio Access (E-UTRA); Radio Resource Control (RRC), "Protocol specification (Release 12)," Sophia Antipolis, France, Sep. 2014.
3GPP TS 36.423 V12.3.0; $3^{rd}$ Generation Partnership Project; Technical Specification Group Radio Access Network; Evolved Universal Terrestrial Radio Access (E-UTRAN), "X2 application protocol (X2AP) (Release 12)," Sophia Antipolis, France, Sep. 2014.
Qualcomm, "Extending the benefits of LTE Advanced to unlicensed spectrum," Apr. 2014.
Ericsson, "High Capacity Solutions for Public Ventures," IWPC workshop, Sep. 19-21, 2012.
Wilhelm Keusgen, "Millimeter Waves in 5G Networks," Fraunhofer Heinrich Hertz Institute, Berlin, Germany, Dec. 11, 2013.
Ronen Vengosh, PureWave networks, "Multi-Operator Small Cells", IWC, Nover.2013IWPC, Dec. 11, 2013.
Motorola Mobility, "New Carrier Type," 3GPP TSG-RAN WG2#78, Prague, Czech Republic, May 21-25, 2012.
Huawei Technologies, HiSilicon, "Views on Rel-12 and onwards for LTE and UMTS," Ljubljana, Slovenia, Jun. 11-12, 2012.
Ronen Vengosh, PureWave networks, "The Case for Multi-Operator Infrastructure," IWC, Nover.2013IWPC, Dec. 11, 2013.

* cited by examiner

METHOD FOR ALLOCATING MULTIPLE COMPONENT CARRIERS, BASE STATION, AND USER EQUIPMENT

CROSS-REFERENCE TO RELATED APPLICATIONS

This application is a continuation of International Application No. PCT/CN2014/092538, filed on Nov. 28, 2014, the disclosure of which is hereby incorporated by reference in its entirety.

TECHNICAL FIELD

The present disclosure relates to the field of communications technologies, and in particular, to a method for allocating multiple component carriers (CC), a base station (BS), and user equipment (UE).

BACKGROUND

With social and economic development and requirements of people for wireless communications technologies, the $3^{rd}$ generation partnership project (3GPP) organization of cellular radio communication is formulating the $4^{th}$ generation cellular communication standard (4G). The 4G standard formulated by the 3GPP standard organization is an advanced system based on a Long Term Evolution (LTE) system, that is, a Long Term Evolution-Advanced (LTE-A) system. Multiple communications scenarios are considered in the LTE system and the LTE-A system. In crowded hotspot areas, for example, a gymnasium, a café, a concert hall, and a supermall, there are a lot of mobile phone users, and services of the users are diversified. Some users perform voice communication (featuring in a high requirement on timeliness) and watch videos (featuring in a large data amount of downlink service packets) by using mobile phones, some users use WeChat (featuring in a large data amount of uplink service packets and a large quantity of service packets), and some users use instant messaging software such as QQ, MSN, and Skype (featuring in that a data amount of downlink service packets or uplink service packets is small but there is a large quantity of service packets). In these occasions, because there is a relatively large quantity of users and services are diversified, a downlink (DL) service or an uplink (UL) service needs a relatively large data amount. However, spectrum resources provided by each operator are limited, and cannot support requirements of many users for diversified services at the same time. Consequently, quality of service (QoS) of downlink services or uplink services of the users may not be better satisfied, causing problems that the users feel that data downloading and data uploading rates decrease, received signal quality is worse, and a delay is relatively long, and the like.

For the foregoing problems, the industry has proposed a solution for the foregoing scenarios. In this solution, it is considered that video services are main data traffic in scenarios such as a gymnasium and a concert hall, and measures need to be taken to implement data offloading of video content in an LTE network, to satisfy a requirement of each UE for watching videos. A self-organizing network (SON) is used in a heterogeneous network (HetNet), to timely turn on or turn off base stations in some cells according to comprehensive statuses, such as a quantity of users, traffic, and links, to implement traffic management, where the heterogeneous network is a network formed by cells of different sizes and types, including a macro cell (Macro cell), a micro cell (Micro cell), a pico cell (Pico cell), a femto cell (Femto cell), and the like.

However, network management is complex in the foregoing solution, and only a scenario in which there is a single telecommunications operator is considered in the solution. The solution is not applicable to a scenario in which multiple telecommunications operators coexist. In an actual scenario, usually multiple telecommunications operators coexist.

Therefore, for a scenario of a hotspot area or a crowded scenario in which multiple telecommunications operators coexist, a solution that can provide fine data and voice services for all users of the multiple telecommunications operators needs to be found urgently.

SUMMARY

Embodiments of the present invention provide a method for allocating multiple component carriers, a base station, and user equipment, to resolve a problem that in a scenario of a hotspot area in which multiple telecommunications operators coexist, because there is a large quantity of UEs, mobile networks of the telecommunications operators are congested and cannot provide fine wireless services for the UEs.

According to a first aspect, an embodiment of the present invention provides a method for allocating multiple component carriers, where the method includes:

receiving, by a high frequency base station, measurement information sent by low and medium frequency base stations of multiple telecommunications operators or measurement reports sent by first user equipments of multiple telecommunications operators, where the high frequency base station works in a high frequency band, the low and medium frequency base stations work in a low and medium frequency band, and the first user equipments are served by the high frequency base station;

allocating, by the high frequency base station according to the measurement information or the measurement reports, multiple component carriers included in high frequency resources to the low and medium frequency base stations or the first user equipments, to obtain an allocation result, and notifying, by the high frequency base station, the allocation result to the low and medium frequency base stations or the first user equipments.

According to a second aspect, an embodiment of the present invention provides a method for allocating multiple component carriers, where the method includes:

receiving, by low and medium frequency base stations of multiple telecommunications operators, measurement reports sent by user equipments served by the low and medium frequency base stations, where the low and medium frequency base stations work in a low and medium frequency band;

obtaining, by the low and medium frequency base stations, measurement information according to the measurement reports and network load statuses of the low and medium frequency base stations;

sending, by the low and medium frequency base stations, the measurement information to a high frequency base station, where the high frequency base station works in a high frequency band;

receiving, by the low and medium frequency base stations, an allocation result sent by the high frequency base station, where the allocation result is obtained by the high frequency base station after the high frequency base station allocates multiple component carriers included in high frequency resources to the low and medium frequency base stations according to the measurement information; and notifying, by the low and medium frequency base stations, the allocation result to the user equipments.

According to a third aspect, an embodiment of the present invention provides a method for allocating multiple component carriers, where the method includes:

sending, by user equipments, measurement reports to a high frequency base station or to low and medium frequency base stations of multiple telecommunications operators, where the high frequency base station works in a high frequency band, and the low and medium frequency base stations work in a low and medium frequency band; and receiving, by the user equipments, an allocation result sent by the high frequency base station or the low and medium frequency base stations, where the allocation result is obtained by the high frequency base station or the low and medium frequency base stations after the high frequency base station allocates or the low and medium frequency base stations allocate multiple component carriers included in high frequency resources to the user equipments according to the measurement reports.

According to a fourth aspect, an embodiment of the present invention provides a high frequency base station, where the high frequency base station works in a high frequency band, and the high frequency base station includes:

a receiving unit, configured to receive measurement information sent by low and medium frequency base stations of multiple telecommunications operators or measurement reports sent by first user equipments of multiple telecommunications operators, where the low and medium frequency base stations work in a low and medium frequency band, and the first user equipments are served by the high frequency base station;

an allocation unit, configured to allocate, according to the measurement information or the measurement reports, multiple component carriers included in high frequency resources to the low and medium frequency base stations or the first user equipments, to obtain an allocation result; and a sending unit, configured to notify the allocation result to the low and medium frequency base stations or the first user equipments.

According to a fifth aspect, an embodiment of the present invention provides a low and medium frequency base station, where the low and medium frequency base station belongs to any one of multiple telecommunications operators, and works in a low and medium frequency band, and the low and medium frequency base station includes:

a first receiving unit, configured to receive a measurement report sent by user equipment served by the low and medium frequency base station;

an analysis unit, configured to obtain measurement information according to the measurement report and a network load status of the low and medium frequency base station;

a first sending unit, configured to send the measurement information to a high frequency base station, where the high frequency base station works in a high frequency;

a second receiving unit, configured to receive an allocation result sent by the high frequency base station, where the allocation result is obtained by the high frequency base station after the high frequency base station allocates multiple component carriers included in high frequency resources to the low and medium frequency base station according to the measurement information; and a second sending unit, configured to notify the allocation result to the user equipment.

According to a sixth aspect, an embodiment of the present invention provides user equipment, where the user equipment includes:

a sending unit, configured to send a measurement report to a high frequency base station or to a low and medium frequency base station of any one of multiple telecommunications operators, where the high frequency base station works in a high frequency band, and the low and medium frequency base station works in a low and medium frequency band; and a receiving unit, configured to receive an allocation result sent by the high frequency base station or the low and medium frequency base station, where the allocation result is obtained by the high frequency base station or the low and medium frequency base station after the high frequency base station or the low and medium frequency base station allocates multiple component carriers included in high frequency resources to the user equipment according to the measurement report.

According to a seventh aspect, an embodiment of the present invention provides a high frequency base station, where the high frequency base station works in a high frequency band, and the high frequency base station includes:

a transceiver, configured to receive measurement information sent by low and medium frequency base stations of multiple telecommunications operators or measurement reports sent by first user equipments of multiple telecommunications operators, where the low and medium frequency base stations work in a low and medium frequency band, and the first user equipments are served by the high frequency base station; and a controller, configured to allocate, according to the measurement information or the measurement reports, multiple component carriers included in high frequency resources to the low and medium frequency base stations or the first user equipments, to obtain an allocation result, where the transceiver is further configured to notify the allocation result to the low and medium frequency base stations or the first user equipments.

According to an eighth aspect, an embodiment of the present invention provides a low and medium frequency base station, where the low and medium frequency base station belongs to any one of multiple telecommunications operators, and works in a low and medium frequency band, and the low and medium frequency base station includes:

a transceiver, configured to receive a measurement report sent by user equipment served by the low and medium frequency base station; and a processor, configured to obtain measurement information according to the measurement report and a network load status of the low and medium frequency base station, where the transceiver is further configured to: send the measurement information to a high frequency base station, where the high frequency base station works in a high frequency; receive an allocation result sent by the high frequency base station, where the allocation result is obtained by the high frequency base station after the high frequency base station allocates multiple component carriers included in high frequency resources to the low and medium frequency base station according to the measurement information; and notify the allocation result to the user equipment.

According to a ninth aspect, an embodiment of the present invention provides user equipment, where the user equipment includes:

a low frequency transceiver, configured to: send a measurement report to a low and medium frequency base station of any one of multiple telecommunications operators, where the low and medium frequency base station works in a low and medium frequency band; and receive an allocation result sent by the low and medium frequency base station, where the allocation result is obtained by the low and medium frequency base station after the low and medium frequency base station allocates multiple component carriers included in high frequency resources to the user equipment according to the measurement report; and a high frequency transceiver, configured to: send the measurement report to a high frequency base station, where the high frequency base station works in a high frequency band; and receive an allocation result sent by the high frequency base station, where the allocation result is obtained by the high frequency base station after the high frequency base station allocates the multiple component carriers included in the high frequency resources to the user equipment according to the measurement report.

By means of solutions provided in the embodiments of the present invention, a high frequency base station is deployed in a hotspot area, and the high frequency base station provides signaling support and a data offloading service for UEs covered by low and medium frequency base stations of multiple telecommunications operators, thereby improving quality of service (QoS) of the UEs, and reducing costs of deploying, by the multiple telecommunications operators, base stations and backhauls.

DESCRIPTION OF EMBODIMENTS

Figure 1:
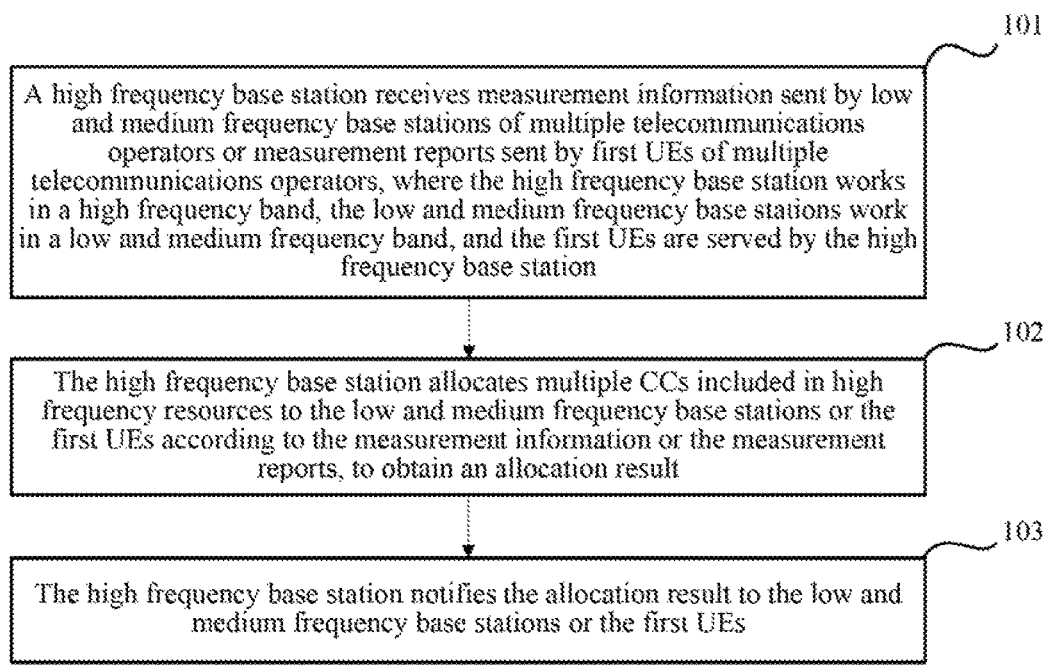
FIG. 1 is a flowchart of allocating, by a high frequency base station, multiple owned high frequency CCs according to an embodiment of the present invention.

In the prior art, a base station deployed by a telecommunications operator communicates with UE in a medium frequency band or a low frequency band. Because spectrum resources of a low and medium frequency band are limited, currently, the medium frequency band or the low frequency band obtained by the telecommunications operator is below 6 GHz, and bandwidth of the frequency band is limited. Therefore, when there is a large quantity of UEs in a crowded hotspot area and each UE has an uplink service or a downlink service, although the UEs may belong to different telecommunications operators, low and medium frequency base stations deployed by the telecommunications operators cannot better satisfy uplink services or downlink services required by respective UEs of the telecommunications operators, for example, an uploading service for a large amount of data, or a high-rate data downloading service.

Embodiments of the present invention provide a method for allocating multiple CCs for multiple telecommunications operators, a base station, and UE. Because the telecommunications operators cannot better satisfy service requirements of UEs served by the operators in a hotspot area (for example, a gymnasium, a concert hall, or a café), and the hotspot area is usually a working area of a third-party company (for example, a gymnasium operation company, or a concert hall operation company), the third-party company may conveniently deploy a high frequency (HF) base station. For example, a frequency band used by the high frequency base station is usually greater than 6 GHz, and the base stations or UEs of the telecommunications operators may use signaling support and a data service that are provided by the high frequency base station, to improve QoS of UE, so that it is avoided that the telecommunications operators respectively deploy base stations or backhaul links (backhaul), thereby reducing device deployment costs of the telecommunications operators. It needs to be pointed out that, although it is defined in the present invention that the high frequency base station deployed by the third party company is in a frequency band above 6 GHz, the present invention does not deny that the third party company may deploy a third party high frequency base station by using an unlicensed spectrum band (Unlicensed Spectrum). For example, a high frequency base station may be deployed in an unlicensed spectrum band such as a 5 GHz frequency band, or a 60 GHz frequency band. Certainly, the high frequency base station may also be deployed in a frequency band above 6 GHz, for example, 10 GHz, 28 GHz, 38 GHz, or 70 GHz. The present invention does not strictly define a specific frequency band used by the high frequency base station.

Technical solutions of the present invention may be applied to the following three scenarios.

Scenario 1: The telecommunications operators deploy respective low and medium frequency base stations and respective backhauls at a hotspot area, the third party company deploys a high frequency base station at the hotspot area, and the high frequency base station provides a data offloading service for the low and medium frequency base stations. Specifically, this scenario may be classified into the following two cases according to capacities of the backhauls of the low and medium frequency base stations: The capacities of the backhauls of the low and medium frequency base stations are limited and the capacities of the backhauls of the low and medium frequency base stations are sufficient.

Scenario 2: The telecommunications operators deploy respective low and medium frequency base stations at a hotspot area but do not deploy respective backhauls, and the third party company deploys a high frequency base station and a backhaul at the hotspot area. The multiple low and medium frequency base stations share the backhaul provided by the high frequency base station, and the high frequency base station provides a data offloading service for the low and medium frequency base stations.

Scenario 3: The telecommunications operators do not deploy respective low and medium frequency base stations or respective backhauls at a hotspot area, and the third party company deploys a high frequency base station and a backhaul at the hotspot area. The operators share a radio access network (RAN) and a backhaul that are provided by the high frequency base station. In this scenario, UEs of the telecommunications operators may be served by the high frequency base station by default.

In the technical solutions of the present invention, UE may also be referred to as a mobile phone, a mobile terminal, a mobile device, or the like, and may communicate with an evolved packet core (EPC) by means of a radio access network (RAN).

The base station may be a macro base station (Macro eNB), a small base station (Small eNB), a micro base station (Micro eNB), a pico base station (Pico eNB), or a femto base station (Femto eNB). An implementation manner of the base station is not limited in the present invention.

The technical solutions in the embodiments of the present invention are described in the following with reference to the accompany drawings and the embodiments in this specification.

Embodiment 1

As shown in FIG. 1, based on the foregoing three scenarios, in this embodiment of the present invention, a process of allocating, by a high frequency base station, multiple owned high frequency CCs is as follows.

Step 101: The high frequency base station receives measurement information sent by low and medium frequency base stations of multiple telecommunications operators or measurement reports sent by first UEs of multiple telecommunications operators, where the high frequency base station works in a high frequency band, the low and medium frequency base stations work in a low and medium frequency band, and the first UEs are served by the high frequency base station.

Step 102: The high frequency base station allocates multiple CCs included in high frequency resources to the low and medium frequency base stations or the first UEs according to the measurement information or the measurement reports, to obtain an allocation result.

Step 103: The high frequency base station notifies the allocation result to the low and medium frequency base stations or the first UEs.

The measurement information sent by each low and medium frequency base station includes information such as a load status and channel state information of the low and medium frequency base station, a quantity of second UEs served by the low and medium frequency base station, and an identity (Identity, ID) of the second UE. The load status of the base station is statistical information. For example, a high load represents one of or a combination of the following cases: network congestion occurs, there is a large quantity of UEs, an average traffic volume of multiple UEs is large, or the like; a medium load represents one of or a combination of the following cases: network traffic is in a medium level, a quantity of UEs is in a medium level, an average traffic volume of multiple UEs is in a medium level, or the like; and a low load represents one of or a combination of the following cases: network traffic is not heavy, there is a small quantity of UEs, an average traffic volume of multiple UEs is relatively small, or the like. Channel state information is obtained based on information about UE, and includes channel state information that is obtained through statistics collection based on UE measurement, and instant channel state information. The UE detects, according to a geographical location, a reference signal sent by a base station, to obtain the instant channel state information, and may feed back the instant channel state information to the base station in a form of a measurement report. Certainly, the measurement report of the UE further includes multiple pieces of information, and this is described in detail in the 3GPP standard specification. The measurement report of the UE is not described in detail in the present invention. Besides, the base station collects statistics on the instant channel state information and the measurement report that are fed back by the UE, to obtain the channel state information.

In scenario 1 and scenario 2, the UEs respectively report the measurement reports to the low and medium frequency base stations serving the UEs, and the low and medium frequency base stations respectively analyze the measurement reports reported by the UEs in coverage areas of the low and medium frequency base stations and network load statuses of the low and medium frequency base stations, to obtain measurement information of the coverage areas, and send the measurement information to the high frequency base station. The network load status of each low and medium frequency base station includes information such as a quantity of UEs in the coverage area of the low and medium frequency base station and a service of each UE. In scenario 3, the high frequency base station directly receives a measurement report sent by UE in a coverage area of the high frequency base station.

Especially, in scenario 1, when capacities of backhauls of the low and medium frequency base stations are limited, before the multiple CCs included in the high frequency resources are allocated to the low and medium frequency base stations according to the measurement information, the high frequency base station may further receive capacities that are sent by the low and medium frequency base stations and that are of first backhauls of the low and medium frequency base stations, where the first backhauls are provided by the low and medium frequency base stations and connect the high frequency base station and the low and medium frequency base stations. When step 102 is performed, the high frequency base station allocates, according to the measurement information and the capacities of the first backhauls, the multiple CCs included in the high frequency resources, to obtain the allocation result.

Especially, in scenario 2, before the multiple CCs included in the high frequency resources are allocated to the low and medium frequency base stations according to the measurement information, the high frequency base station may further receive percentages that are sent by the low and medium frequency base stations, that are accounted for by the low and medium frequency base stations, and that are of a second backhaul of the high frequency base station, where the second backhaul is provided by the high frequency base station and connects the high frequency base station and the low and medium frequency base station. When step 102 is performed, the high frequency base station allocates, according to the measurement information and the percentages that are accounted for by the low and medium frequency base stations and that are of the second backhaul, the multiple CCs included in the high frequency resources, to obtain the allocation result.

In an actual application, the first backhaul or the second backhaul may be a connection implemented by means of a wired medium, for example, fiber, coaxial cable, or network cable, or may be a connection implemented by means of a wireless medium, for example, millimeter wave, or microwave.

In scenario 1 and scenario 2, when step 102 is performed, a specific process of allocating, by the high frequency base station, the multiple CCs included in the high frequency resources to the low and medium frequency base stations according to the measurement information is: allocating, by the high frequency base station to the low and medium frequency base stations according to the measurement information, frequency band ranges of CCs that are used for data offloading in the high frequency resources. For example, the high frequency base station configures N CCs, and the CCs are located in different frequency band ranges. When the high frequency base station determines, according to measurement information of one or more low and medium frequency base stations, one or more CCs used by each low and medium frequency base station in the N CCs, the high frequency base station determines a frequency band range of the CC that is used by each low and medium frequency base station for data offloading. The frequency band range of the CC may be represented by using an index number of the CC, for example, high frequency CC_1, CC_2, . . . , CC_N. It needs to be pointed out that, the low and medium frequency base station does not directly use the frequency band range of the high frequency base station, instead, a high frequency transceiver module is configured in one or more UEs covered and served by the low and medium frequency base station, and the high frequency transceiver module may implement high frequency sending and receiving functions. Therefore, the UE may receive data or signaling information carried in one or more CCs of the high frequency base stations, and the UE may send data or signaling information by using one or more CCs of the high frequency base station. Therefore, the UE can achieve both an objective of implementing data offloading for the low and medium frequency base station serving the UE, and an objective of improving QoS of the UE. In addition, optionally, after the frequency band ranges of the CCs used for data offloading in the high frequency resources are allocated to the low and medium frequency base stations, that is, which CCs are used by the low and medium frequency base stations for data offloading is determined, the high frequency base station may further allocate frequency bands of the specifically used CCs in the frequency band ranges to second UEs served by the low and medium frequency base stations, that is, the high frequency base station determines, according to the measurement information of the low and medium frequency base stations of the multiple operators, an index number of one or more CCs, that is, each CC, used by the second UE. In this way, the high frequency base station may monitor load statuses of multiple high frequency CCs, and a UE-specific (UE-Specific) mechanism for allocating multiple CCs is used, for example, a UE-specific mechanism for allocating multiple high frequency CCs, so that quantities of UEs attached to the CCs and services of the UEs are basically the same, thereby reducing service loads of some high-load CCs, and ensuring load balance of the high frequency CCs.

In scenario 3, when step 102 is performed, a specific process of allocating, by the high frequency base station, the multiple CCs included in the high frequency resources to the first UEs according to the measurement reports is: allocating, by the high frequency base station, frequency bands of used CCs in the high frequency resources to the first UEs according to the measurement reports, that is, quantities of the high frequency CCs and an index number of each CC, for example, high frequency CC_1, CC_2, . . . , CC_N.

Based on different communications systems, UE may connect to only one CC at a time, or may connect to multiple CCs at a time. For example, compared with an LTE system, multiple CCs and a carrier aggregation (CA) technology are introduced in an LTE-A system, and concepts of primary component carrier (PCC) and secondary component carrier (SCC) are introduced in the CA technology. In this way, UE based on the CA technology may perform uplink and downlink data and signaling communication by using one or more CCs at the same time, thereby implementing high-rate data transmission and high-rate signaling transmission. A carrier of a primary base station includes a PCC and an SCC, and a carrier of a secondary base station includes an SCC. An area covered by the primary base station and providing a primary service for the UE is referred to as a serving cell of the UE, and the primary service refers to a service of supporting uplink and downlink signaling and data communication between the UE and the base station. An area covered by the secondary base station and providing a secondary service for the UE is referred to as a secondary cell, and the secondary service refers to a service of supporting uplink and downlink data communication between the UE and the base station. When the UE is in a serving cell, the UE is covered by the primary base station and receives the primary service provided by the serving cell. When the UE is in a serving cell and is covered by both the primary base station and the secondary base station, when receiving the primary service provided by the serving cell, the UE may further receive the secondary service provided by the secondary cell. In the LTE system, the UE can connect to only one CC at a time, and the CC is a PCC in the LTE system. In Release-10 and Release-11 of the LTE-A system, the UE can connect to multiple CCs at a time, that is, one PCC and one or more SCCs. In LTE-A Release-12 and the fifth cellular communications (5G) system, UE belonging to an operator may connect to a PCC of one primary base station, an SCC of one or more primary base stations, and a high frequency CC of a secondary base station (for example, a third party high frequency base station). The high frequency CC is generally an SCC and is used for data offloading. It needs to be especially pointed out that, when the operator uses the third party high frequency base station as the primary base station, that is, one or more operators and the third party company share an RAN base station, the CC of the high frequency base station includes one PCC and multiple SCCs, and an allocation mechanism for the PCC and the SCC is UE-Specific. For example, UE_1 may use CC_1 as a PCC and CC_2 as an SCC, and UE_2 may use CC_2 as a PCC and CC_1 as an SCC. Without loss of generality, the high frequency base station may allocate a PCC and an SCC to each UE according to a measurement report of the UE and a load status and a backhaul status of each operator, that is, specify quantities of PCCs and SCCs used by the UE and index numbers of the PCC and the SCC.

Specifically, in scenario 1 and scenario 2, when step 103 is performed, the high frequency base station may notify the allocation result to the low and medium frequency base stations in the following two manners:

Manner 1

The high frequency base station notifies the allocation result to the low and medium frequency base stations by using one-bit (Bit) signaling, where the one-Bit signaling is used to notify the UEs served by the low and medium frequency base stations whether to use the multiple CCs included in the high frequency resources for data offloading.

Preferably, the high frequency base station may send, by using an X2 interface or S1 interface defined in the 3GPP standard, one-bit signaling whose content is a "0" state or a "1" state, to notify the low and medium frequency base stations whether to use the high frequency resources. The "0" state represents that the low and medium frequency base station does not use one or more CCs included in the high frequency resources, and the "1" state represents that the low and medium frequency base station uses one or more CCs included in the high frequency resources. For example, if second UE in a coverage area of a low and medium frequency base station uses one or more high frequency CCs for a data offloading service, the high frequency base station sends one-bit signaling whose content is the "1" state to the low and medium frequency base station by using the X2 interface or S1 interface; or if second UE in a coverage area of a low and medium frequency base station does not a frequency band of a high frequency CC, the high frequency base station sends one-bit signaling whose content is the "0" state to the low and medium frequency base station by using the X2 interface or S1 interface.

Data and/or signaling exchange is performed between the high frequency base station and the low and medium frequency base station by using the X2 interface defined in the 3GPP standard or the S1 interface defined in the 3GPP standard. From the perspective of a carrier medium, the X2 interface or S1 interface may implement connection by using a wired medium, for example, fiber, coaxial cable, or network cable; or by using a wireless medium, for example, millimeter wave, or microwave.

After the high frequency base station sends the one-Bit signaling to notify the allocation result to the low and medium frequency base stations, the high frequency base station may further notify, by using signaling or downlink data packets, the allocation result to the second UEs served by the low and medium frequency base stations. The signaling and the downlink data packets are used to indicate frequency bands of CCs used by the second UEs in the high frequency resources. Meanwhile, the low and medium frequency base stations forward the received one-Bit signaling to the second UEs in the coverage areas, and the second UEs determine content of the one-Bit signaling. If the content of the one-Bit signaling is the "1" state, the high frequency transceiver module is enabled, to receive data or signaling information that is sent by the high frequency base station in a high frequency, or if the content of the one-Bit signaling is the "0" state, the high frequency transceiver module is not enabled.

A specific process of notifying, by the high frequency base station by using the downlink data packets, the allocation result to the second UEs served by the low and medium frequency base stations is: filling, by the high frequency base station, a Media Access Control (MAC) mapping table according to the allocation result, adding the MAC mapping table to MAC information in the downlink data packets, and sending the downlink data packets to the second UEs by using a physical data shared channel (PDSCH).

If the high frequency resources owned by the high frequency base station are represented by using eight Bits of one byte (Byte), as shown in Table 1, for example, seven Bits may be used to represent seven high frequency CCs, and one Bit is reserved for future use, "0" or "1" is set in Bits corresponding to C1 to C7, to represent a status of whether one or more CCs are used.

TABLE 1

| $C_7$ | $C_6$ | $C_5$ | $C_4$ | $C_3$ | $C_2$ | $C_1$ | R | Oct 1 |
|---|---|---|---|---|---|---|---|---|

Manner 2

The high frequency base station sends multi-bit signaling by using the X2 interface or S1 interface, to notify the allocation result to the low and medium frequency base stations. The multi-bit signaling is used to notify a frequency band range of one or more used CCs in the high frequency resources to one or more UEs served by the low and medium frequency base stations. The multi-bit signaling may be one piece of multi-bit signaling, or may be multiple pieces of multi-bit signaling.

A form of the multi-bit signaling may be as follows:

DL CC1(0/1), DL CC2(0/1), . . . DL CCi(0/1)
UL CC1(0/1), UL CC2 (0/1), . . . UL CCj(0/1)

"0" represents that the frequency band of the high frequency CC is not used, and "1" represents that the frequency band of the high frequency CC is used. For example, if the high frequency resources owned by the high frequency base station are divided into eight CCs, where four DL CCs are represented by using high four bits of one Byte, and four UL CCs are represented by using low four bits of one Byte, if the CCs allocated by the high frequency base station to the one or more UEs served by the low and medium frequency base stations, to perform uplink and downlink transmission are DL CC1 and UL CC2, the high frequency base station sends one-Byte signaling to the low and medium frequency base stations, and content of the signaling is "00010010".

The low and medium frequency base stations determine allocated frequency band ranges of CCs according to the received multi-bit signaling, and further determine, for the second UEs in the coverage areas, frequency bands of specifically used CCs in the allocated frequency band ranges of the CCs.

Specifically, the low and medium frequency base stations may directly notify the frequency bands of the used CCs to the UEs by using signaling. Alternatively, the low and medium frequency base stations may fill MAC mapping tables according to the frequency bands of the CCs used by the UEs in the coverage areas in the high frequency resources, add the MAC mapping tables to MAC information in downlink data packets sent to the UEs, and notify the frequency bands of the used CCs to the UEs by using a PDSCH.

It should be noted that, when the X2 interface or S1 interface between the low and medium frequency base stations and the high frequency base station are non-ideal, a rate of transmitting information including a large amount of data by using the X2 interface or S1 interface is relatively slow. Consequently, a delay may be caused, and efficiency and timeliness of the system are poor. Therefore, to improve the efficiency and the timeliness of the system, the high frequency base station preferably notifies the allocation result to the low and medium frequency base stations in manner 1. When the X2 interface or S1 interface between the low and medium frequency base stations and the high frequency base station are ideal, because the X2 interface or S1 interface can carry the allocation result of all CCs, the high frequency base station preferably notifies the allocation result to the low and medium frequency base stations in manner 2.

In addition, in scenario 3, when step 103 is performed, the high frequency base station may send broadcast information carrying the allocation result to the first UEs by using a physical broadcast channel (PBCH).

After the high frequency base station notifies the allocation result to the low and medium frequency base stations or the first UEs, the high frequency base station may communicate, based on the frequency bands of the CCs indicated in the allocation result, with the second UEs served by the low and medium frequency base stations or with the first UEs, thereby achieving an objective of providing a data offloading service for UEs of the telecommunications operators.

Embodiment 2

Figure 2:
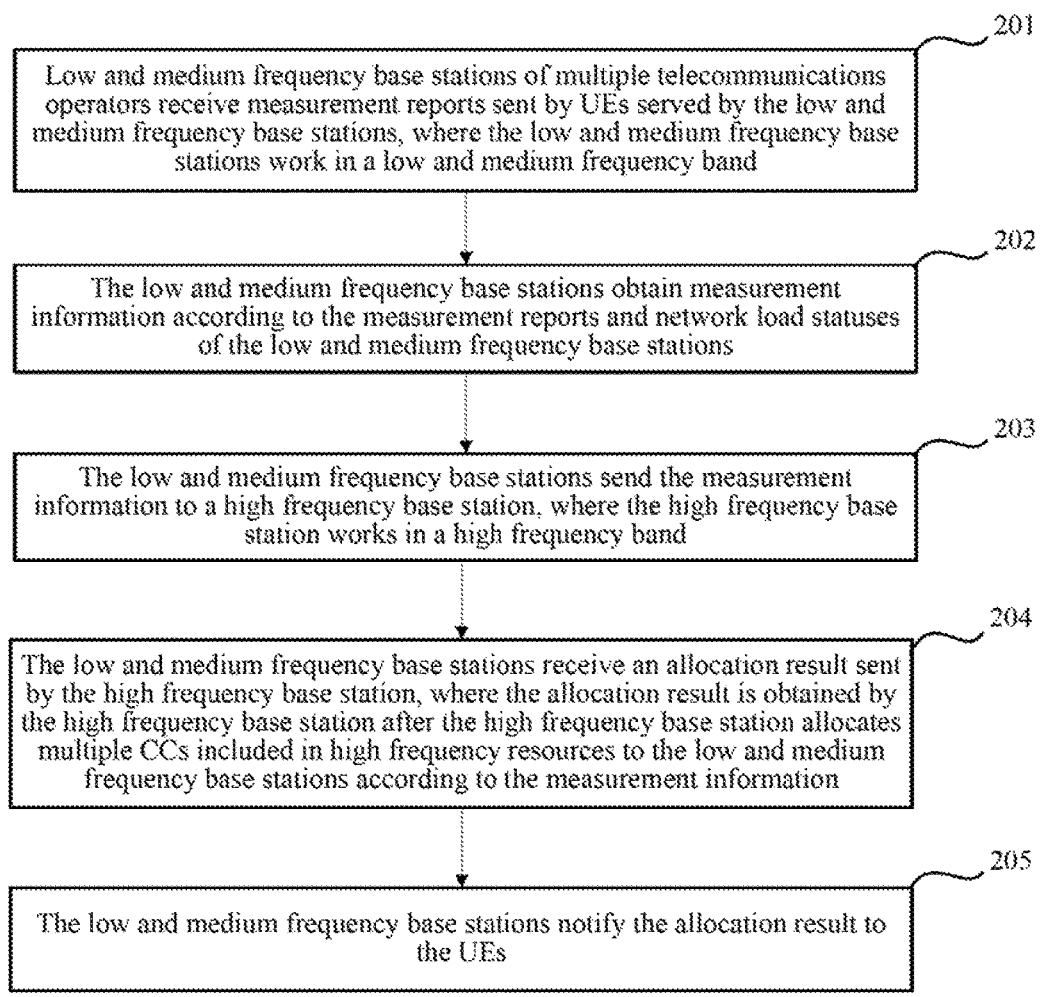
FIG. 2 is a flowchart of notifying, by low and medium frequency base stations, an allocation result of multiple high frequency CCs to UEs according to an embodiment of the present invention.

As shown in FIG. 2, based on the foregoing three scenarios, a process of notifying, by low and medium frequency base stations of telecommunications operators, an allocation result of multiple high frequency CCs to UEs is as follows.

Step 201: Low and medium frequency base stations of multiple telecommunications operators receive measurement reports sent by UEs served by the low and medium frequency base stations, where the low and medium frequency base stations work in a low and medium frequency band.

Step 202: The low and medium frequency base stations obtain measurement information according to the measurement reports and network load statuses of the low and medium frequency base stations.

Step 203: The low and medium frequency base stations send the measurement information to a high frequency base station, where the high frequency base station works in a high frequency band.

Step 204: The low and medium frequency base stations receive an allocation result sent by the high frequency base station, where the allocation result is obtained by the high frequency base station after the high frequency base station allocates multiple CCs included in high frequency resources to the low and medium frequency base stations according to the measurement information.

Step 205: The low and medium frequency base stations notify the allocation result to the UEs.

The network load status of each low and medium frequency base station includes information such as a quantity of UEs in a coverage area of the low and medium frequency base station and a service of each UE. The measurement information includes information such as a load status and channel state information of each low and medium frequency base station, a quantity of UEs served by the low and medium frequency base station, and an ID of the UE. The load status of the base station is statistical information. For example, a high load represents the following cases: network congestion occurs, there is a large quantity of UEs, an average traffic volume of multiple UEs is large, and the like; a medium load represents the following cases: network traffic is in a medium level, a quantity of UEs is in a medium level, an average traffic volume of multiple UEs is in a medium level, and the like; and a low load represents the following cases: network traffic is not heavy, there is a small quantity of UEs, and an average traffic volume of multiple UEs is relatively small, and the like. Channel state information is obtained based on information about UE, and includes channel state information that is obtained through statistics collection based on UE measurement, and instant channel state information. The UE detects, according to a geographical location, a reference signal sent by a base station, to obtain the instant channel state information, and may feed back the instant channel state information to the base station in a form of a measurement report. In addition, the base station collects statistics on the instant channel state information and the measurement report that are fed back by the UE, to obtain the channel state information.

Especially, in scenario 1, when capacities of backhauls of the low and medium frequency base stations are limited, before receiving the allocation result sent by the high frequency base station, the low and medium frequency base stations may further send capacities of first backhauls of the low and medium frequency base stations to the high frequency base station. The first backhauls are provided by the low and medium frequency base stations and connect the low and medium frequency base stations and the high frequency base station.

Especially, in scenario 2, before receiving the allocation result sent by the high frequency base station, when step 203 is performed, the low and medium frequency base stations may further send percentages that are accounted for by the low and medium frequency base stations and that are of a second backhaul of the high frequency base station to the high frequency base station. The second backhaul is provided by the high frequency base station and connects the low and medium frequency base stations and the high frequency base station.

In an actual application, the first backhaul or the second backhaul may be a connection implemented by means of a wired medium, for example, fiber, coaxial cable, or network cable, or may be a connection implemented by means of a wireless medium, for example, millimeter wave, or microwave.

Specifically, if in step 204, the low and medium frequency base stations receive one-bit signaling that is sent by the high frequency base station by using an X2 interface or S1 interface and that carries the allocation result, the low and medium frequency base stations may determine, based on the one-bit signaling, whether to use the high frequency resources owned by the high frequency base station. Content of the one-bit signaling is a "0" state or a "1" state. The "0" state represents that the low and medium frequency base station does not use one or more CCs included in the high frequency resources, and the "1" state represents that the low and medium frequency base station uses one or more CCs included in the high frequency resources. A specific process of notifying, by the low and medium frequency base stations, the allocation result to the UEs is: forwarding, by the low and medium frequency base stations, the one-bit signaling carrying the allocation result to the UEs, so that the UEs determine, according to the one-bit signaling, whether to receive signaling or downlink data packets sent by the high frequency base station, where the signaling and downlink data packets are used to indicate frequency bands of CCs used by the UEs in the high frequency resources. Specifically, if the content of the one-bit signaling is the "1" state, the UE enables a high frequency transceiver module, and receives signaling or data information that is sent by the high frequency base station in a high frequency; or if the content of the one-bit signaling is the "0" state, the UE does not enable a high frequency transceiver module, does not receive signaling or data information that is sent by the high frequency base station in a high frequency, and subsequently, does not send uplink signaling and/or uplink data information to the high frequency base station.

Data and/or signaling exchange is performed between the high frequency base station and the low and medium frequency base station by using the X2 interface defined in the 3GPP standard or the S1 interface defined in the 3GPP standard. From the perspective of a carrier medium, the X2 interface or S1 interface may implement connection by using a wired medium, for example, fiber, coaxial cable, or network cable; or by using a wireless medium, for example, millimeter wave, or microwave.

Specifically, if in step 204, the low and medium frequency base stations receive multi-bit signaling that is sent by the high frequency base station by using an X2 interface or S1 interface and that carries the allocation result, the low and medium frequency base stations may determine, based on the multi-bit signaling, frequency band ranges of CCs used for data offloading in the high frequency resources. The frequency band ranges of the CCs may be represented by using index numbers of the CCs, for example, high frequency CC_1, CC_2, . . . , CC_N. It needs to be pointed out that the low and medium frequency base station does not directly use the frequency band of the high frequency base station, instead, a high frequency transceiver module is configured in one or more UEs covered and served by the low and medium frequency base station. Therefore, the UE may receive and send data or signaling information carried in the one or more CCs of the high frequency base station, so that the UE achieves both an objective of offloading data for a low and medium frequency base station serving the UE and an objective of improving QoS of the UE. Subsequently, a specific process of notifying, by the low and medium frequency base stations, the allocation result to the UEs is: allocating, by the low and medium frequency base stations, frequency bands of used CCs in the frequency band ranges to the UEs based on the determined frequency band ranges, that is, after determining which high frequency CCs are used by the low and medium frequency base stations for data offloading. That is, the low and medium frequency base stations may determine, according to a measurement report reported by each UE, an index number of one or more CCs, that is, each CC, used by the UE, and notify a frequency band of the used CC in the frequency band range to the UE, that is, a quantity of high frequency CCs used by the UE and an index number of each CC.

Specifically, the low and medium frequency base stations may notify the frequency bands of the used CCs in the frequency band ranges to the UEs by using signaling or downlink data packets.

A specific process of notifying, by the low and medium frequency base stations, the frequency bands of the used CCs in the frequency band ranges to the UEs by using the downlink data packets is: filling, by the low and medium frequency base stations, MAC mapping tables according to the frequency bands that are allocated to the UEs and that are of the used CCs in the frequency band ranges, where a specific form of the mapping table is shown in Table 1; adding, by the low and medium frequency base stations, the MAC mapping tables to MAC information in the downlink data packets, and sending the downlink data packets to the UEs by using a PDSCH.

Embodiment 3

Figure 3:
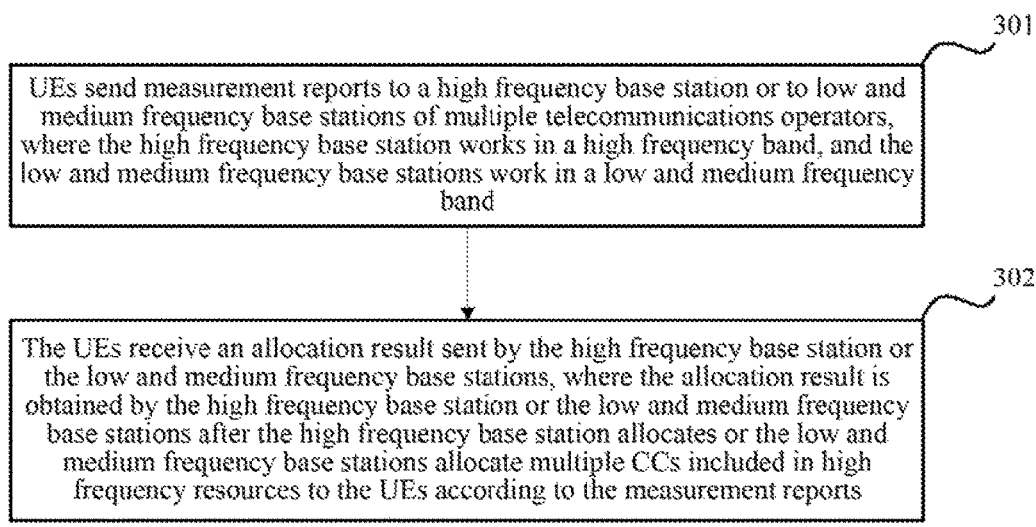
FIG. 3 is a flowchart of communicating, by UEs, with a high frequency base station according to an embodiment of the present invention.

As shown in FIG. 3, based on the foregoing three scenarios, a process of communicating, by UEs, with a high frequency base station is as follows.

Step 301: UEs send measurement reports to a high frequency base station or to low and medium frequency base stations of multiple telecommunications operators, where the high frequency base station works in a high frequency band, and the low and medium frequency base stations work in a low and medium frequency band.

Step 302: The UEs receive an allocation result sent by the high frequency base station or the low and medium frequency base stations, where the allocation result is obtained by the high frequency base station or the low and medium frequency base stations after the high frequency base station allocates or the low and medium frequency base stations allocate multiple CCs included in high frequency resources to the UEs according to the measurement reports.

Specifically, in scenario 1 and scenario 2, the UEs send the measurement reports to the low and medium frequency base stations, and in scenario 3, the UEs send the measurement reports to the high frequency base station.

In scenario 1 and scenario 2, a processing of receiving, by the UEs, the allocation result from the high frequency base station or the low and medium frequency base stations in step 302 is:

receiving, by the UEs, one-bit signaling that is forwarded by the low and medium frequency base stations and that carries the allocation result, and determining, according to the one-bit signaling, whether to receive signaling or downlink data packets that is or are sent by the high frequency base station and that carries or carry the allocation result. For example, when content of the one-bit signaling is a "1" state, the UEs determine to receive signaling or data information that is sent by the high frequency base station in a high frequency, or when content of the one-bit signaling is a "0" state, the UEs determine to not receive signaling or data information that is sent by the high frequency base station in a high frequency. When the UEs determine to receive the signaling or data information, a configured high frequency transceiver module is enabled, to receive the signaling or downlink data packet sent by the high frequency base station. The signaling and downlink data packets are used to indicate frequency bands of CCs used by the UEs in the high frequency resources.

Alternatively, the UEs receive signaling or downlink data packets that is or are sent by the low and medium frequency base stations and that carries or carry the allocation result, where the signaling and downlink data packets are used to indicate frequency bands of CCs used by the UEs in the high frequency resources.

In scenario 3, a process of receiving, by the UEs, the allocation result from the high frequency base station in step 302 is: receiving, by the UEs, broadcast information that is sent by the high frequency base station by using a PBCH and that carries the allocation result.

Further, after receiving the allocation result sent by the high frequency base station or the low and medium frequency base stations, the UEs may communicate with the high frequency base station based on the frequency bands of the CCs indicated in the allocation result, to achieve an objective of offloading data for the low and medium frequency base stations serving the UEs and an objective of improving QoS of the UEs.

To describe the technical solutions of the present invention more clearly, the following further describes the foregoing three scenarios by using Embodiment 4 to Embodiment 7. It should be noted that, the following four embodiments are merely some embodiments of the present invention, and do not limit the present invention.

Embodiment 4

Figure 4:
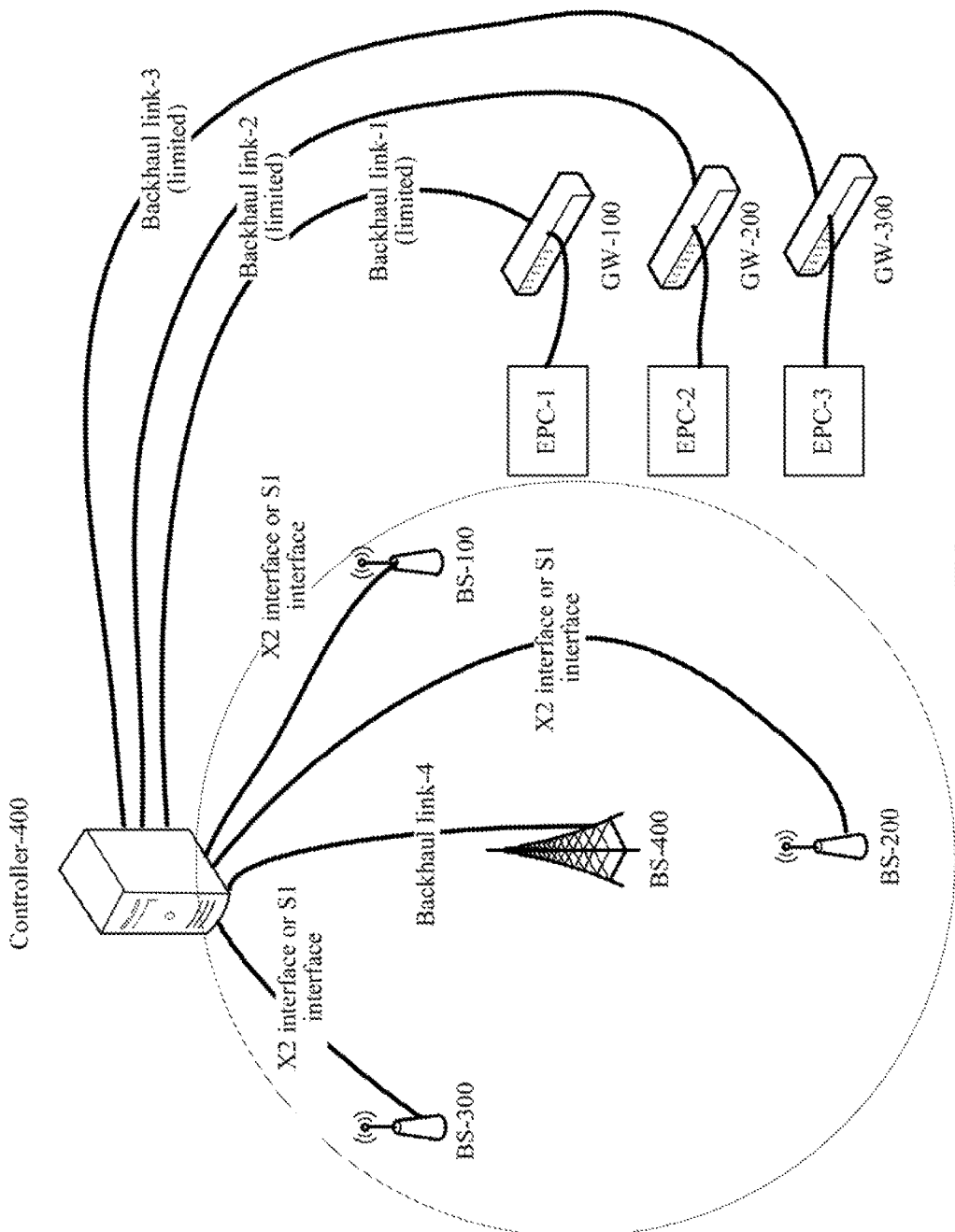
FIG. 4 is a schematic diagram of a deployment solution of a high frequency base station based on a limited backhaul according to an embodiment of the present invention.

Referring to FIG. 4, FIG. 4 is a schematic diagram of a deployment solution of a high frequency base station based on a limited backhaul according to this embodiment of present invention based on scenario 1 in which capacities of backhauls of low and medium frequency base stations are limited. BS-100, BS-200, and BS-300 are low and medium frequency base stations of multiple telecommunications operators, and work in a low and medium frequency band. BS-400 is a high frequency base station of a third party company, and works in a high frequency band. Controller-400 is a controller of BS-400, and Controller-400 and BS-400 are connected by using backhaul-4. BS-100, BS-200, and BS-300 are connected to Controller-400 by using an X2 interface or S1 interface. EPC-1, EPC-2, and EPC-3 respectively are core networks of BS-100, BS-200, and BS-300. A gateway GW-100 of EPC-1, a gateway GW-200 of EPC-2, and a gateway GW-300 of EPC-3 are connected to Controller-400 respectively by using backhaul-1, backhaul-2, and backhaul-3. Because a backhaul is usually implemented by means of a wired fiber or wireless microwave, and deployment costs are relatively high, multiple telecommunications operators may deploy a small quantity of backhauls or simply deploy backhauls from the perspective of costs. Consequently, capacities of backhaul-1, backhaul-2, and backhaul-3 are limited.

It should be noted that the controller is a composition part of the high frequency base station. In an actual application, the controller and the high frequency base station may be in a same geographical location, or in different geographical locations. For the convenience of description, in schematic diagrams of the embodiments of the present invention, the controller and the high frequency base station are drawn separately. In addition, in an actual scenario, because a site of a working area of the third party company is limited, the low and medium frequency base stations and the high frequency base station are usually deployed in a same geographical location. For the convenience of description, in the schematic diagrams of the embodiments of the present invention, the low and medium frequency base stations and the high frequency base station are drawn separately. In addition, although backhaul-1, backhaul-2, and backhaul-3 are connected to Controller-400 in FIG. 4, actually it represents that backhaul-1, backhaul-2, backhaul-3, and Controller-400 are placed in a same geographical location, for example, on a same cabinet. In an actual scenario, BS-100, BS-200, and BS-300 are respectively connected to backhaul-1, backhaul-2, and backhaul-3 by means of a wired medium or a wireless medium, and are separately connected to Controller-400 by using respective an X2 interface or S1 interface. The capacities of backhaul-1, backhaul-2, and backhaul-3 are sent by BS-100, BS-200, and BS-300 to Controller-400 by using the X2 interface or S1 interface.

Figure 5:
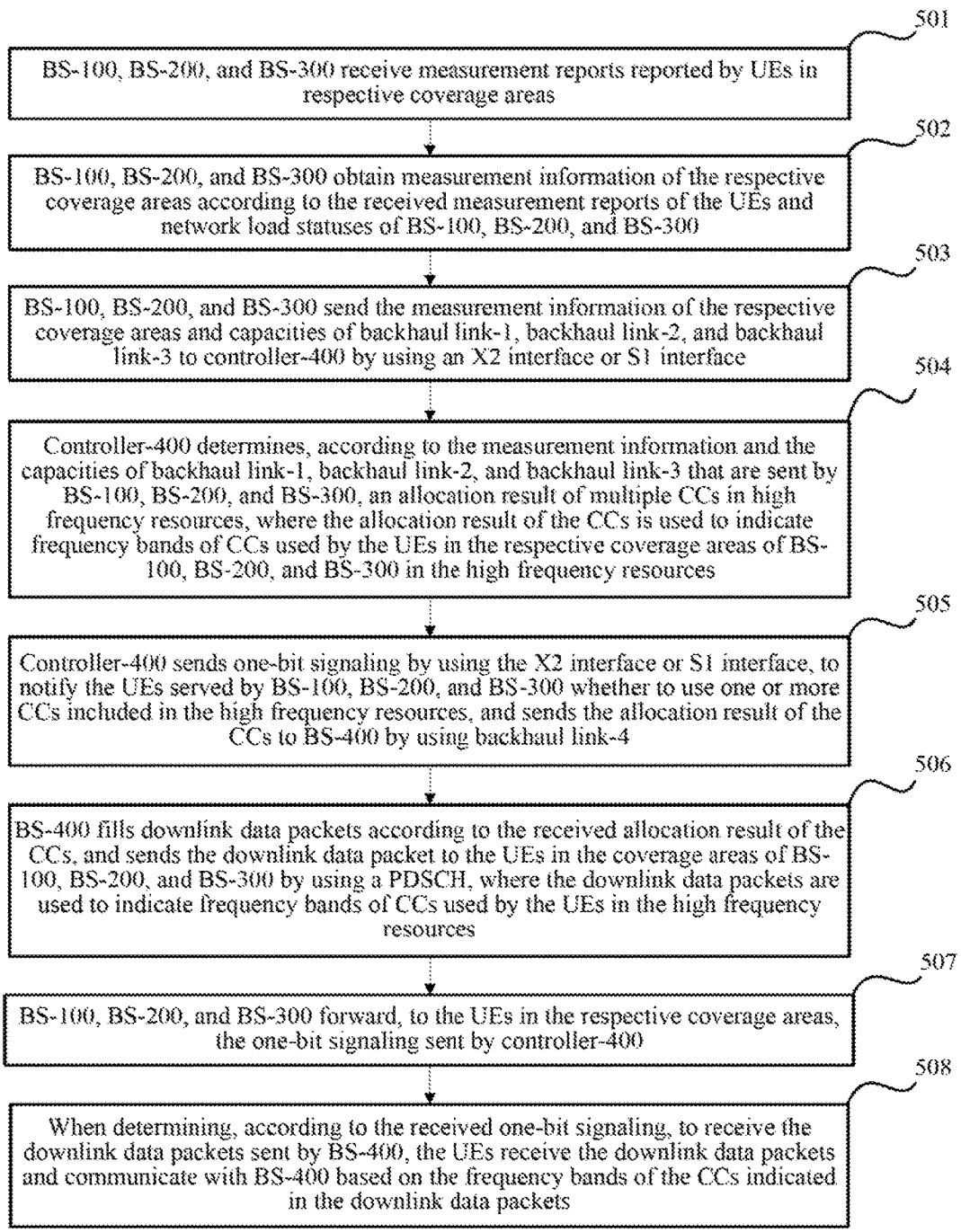
FIG. 5 is a detailed flowchart of providing, by a high frequency base station based on a limited backhaul, a data offloading service for UEs according to an embodiment of the present invention.

Based on a system architectural diagram in FIG. 4, assuming that an X2 interface or S1 interface of the high frequency base station is non-ideal, when backhaul resources between the low and medium frequency base stations and the high frequency base station are limited, as shown in FIG. 5, a detailed process of providing, by the high frequency base station, a data offloading service for UEs covered by the low and medium frequency base stations of the multiple telecommunications operators specifically includes the following steps.

Step 501: BS-100, BS-200, and BS-300 receive measurement reports reported by UEs in respective coverage areas. For example, assuming that UE-100, UE-101, and UE-102 are users covered by BS-100, UE-200, UE-201, and UE202 are users covered by BS-200, and UE-300, UE-301, and UE-302 are users covered by BS-300. The UEs perform, in a low and medium frequency band, normal DL or UL communication with the base stations serving the UEs. When the UEs enter a hotspot area or a crowded area, although BS-100, BS-200, and BS-300 can cover the hotspot area, because there is a large quantity of UEs, high-rate data downloading services or services for uploading a large amount of data that are required by the UEs cannot be better satisfied. Consequently, QoS of the UEs are reduced. Therefore, UE-100, UE-101, and UE-102 need to report respective measurement reports to BS-100 serving UE-100, UE-101, and UE-102; similarly, UE-200, UE-201, and UE-202 need to report respective measurement reports to BS-200 serving UE-200, UE-201, and UE-202, and UE-300, UE-301, and UE-302 need to report respective measurement reports to BS-300 serving UE-300, UE-301, and UE-302.

Step 502: BS-100, BS-200, and BS-300 obtain measurement information of the respective coverage areas according to the received measurement reports of the UEs and network load statuses of BS-100, BS-200, and BS-300.

Specifically, the network load statuses of BS-100, BS-200, and BS-300 include information such as quantities of UEs in the respective coverage areas and services of the UEs. BS-100, BS-200, and BS-300 perform analysis and calculation, with reference to the network load statuses, on the measurement reports reported by the UEs, to obtain the measurement information of the respective coverage areas. The measurement information includes information such as a load status of each low and medium frequency base station, a quantity of UEs covered by each low and medium frequency base station, an ID of the UE, environment information of a link (for example, channel state information) of the UE, so that the UEs in the coverage areas can be better monitored.

Step 503: BS-100, BS-200, and BS-300 send the measurement information of the respective coverage areas and capacities of backhaul-1, backhaul-2, and backhaul-3 to Controller-400 by using an X2 interface or S1 interface.

Data and/or signaling exchange is performed between BS-100, BS-200, and BS-300 and Controller-400 by using the X2 interface or S1 interface defined in the 3GPP standard. From the perspective of a carrier medium, the X2 interface or S1 interface may implement connection by using a wired medium, for example, fiber, coaxial cable, or network cable; or by using a wireless medium, for example, millimeter wave, or microwave.

Step 504: Controller-400 determines, according to the measurement information and the capacities of backhaul-1, backhaul-2, and backhaul-3 that are sent by BS-100, BS-200, and BS-300, an allocation result of multiple CCs in high frequency resources, where the allocation result of the CCs is used to indicate frequency bands of CCs used by the UEs in the respective coverage areas of BS-100, BS-200, and BS-300 in the high frequency resources.

Specifically, Controller-400 respectively calculates communication traffic of BS-100, BS-200, and BS-300 in each CC frequency band according to the received measurement information and a capacity of a corresponding backhaul, and determines frequency band ranges of CCs used by BS-100, BS-200, and BS-300 in the owned high frequency resources, and further respectively determines frequency bands that are of CCs specifically used by the UEs in the coverage areas of BS-100, BS-200, and BS-300 and that are in the frequency band ranges of one or more CCs allocated to the low and medium frequency base stations serving the UEs.

Step 505: Controller-400 sends one-bit signaling by using the X2 interface or S1 interface, to notify the UEs served by BS-100, BS-200, and BS-300 whether to use one or more CCs included in the high frequency resources, and sends the allocation result of the CCs to BS-400 by using backhaul-4.

Because the X2 interface or S1 interface between Controller-400 and BS-100, BS-200, and BS-300 are non-ideal, a rate of transmitting information including a large amount of data by using the X2 interface or S1 interface is relatively slow. Consequently, a delay may be caused, and efficiency and timeliness of the system are poor. Therefore, to improve the efficiency and timeliness of the system, in this embodiment of the present invention, Controller-400 directly divides the owned high frequency CCs for the UEs covered by the low and medium frequency base stations, and notifies, over the X2 interface or S1 interface by using one piece of one-bit signaling whose content is a "0" state or a "1" state, the low and medium frequency base stations whether to use the high frequency resources. The "0" state represents that the low and medium frequency base station does not use one or more CCs included in the high frequency resources, and the "1" state represents that the low and medium frequency base station uses one or more CCs included in the high frequency resources. For example, if UE in the coverage area of BS-100 uses a frequency band of a high frequency CC, Controller-400 sends one-bit signaling whose content is the "1" state to BS-100, and if UE in the coverage area of BS-200 does not use a frequency band of a high frequency CC, Controller-400 sends one-bit signaling whose content is the "0" state to BS-200.

Step 506: BS-400 fills downlink data packets according to the received allocation result of the CCs, and sends the downlink data packet to the UEs in the coverage areas of BS-100, BS-200, and BS-300 by using a PDSCH, where the downlink data packets are used to indicate frequency bands of CCs used by the UEs in the high frequency resources.

Specifically, BS-400 may fill a MAC mapping table according to the received allocation result of the CCs, and add the MAC mapping table to MAC information in the downlink data packets sent to the UEs.

Step 507: BS-100, BS-200, and BS-300 forward, to the UEs in the respective coverage areas, the one-bit signaling sent by Controller-400.

It should be noted that there is no particular sequence between step 506 and step 507 during implementation.

Step 508: When determining, according to the received one-bit signaling, to receive the downlink data packets sent by BS-400, the UEs receive the downlink data packets and communicate with BS-400 based on the frequency bands of the CCs indicated in the downlink data packets.

Specifically, if content of the one-bit signaling is the "0" state, high frequency transceiver modules are not enabled; or if content of the one-bit signaling is the "1" state, the UEs enable high frequency transceiver modules, receive the downlink data packets that are sent by the high frequency base station in a high frequency, read corresponding MAC fields from the downlink data packets, obtain indications of frequency bands of one or more used CCs, and communicate with BS-400 based on the indicated frequency bands of the CCs.

Embodiment 5

Figure 6:
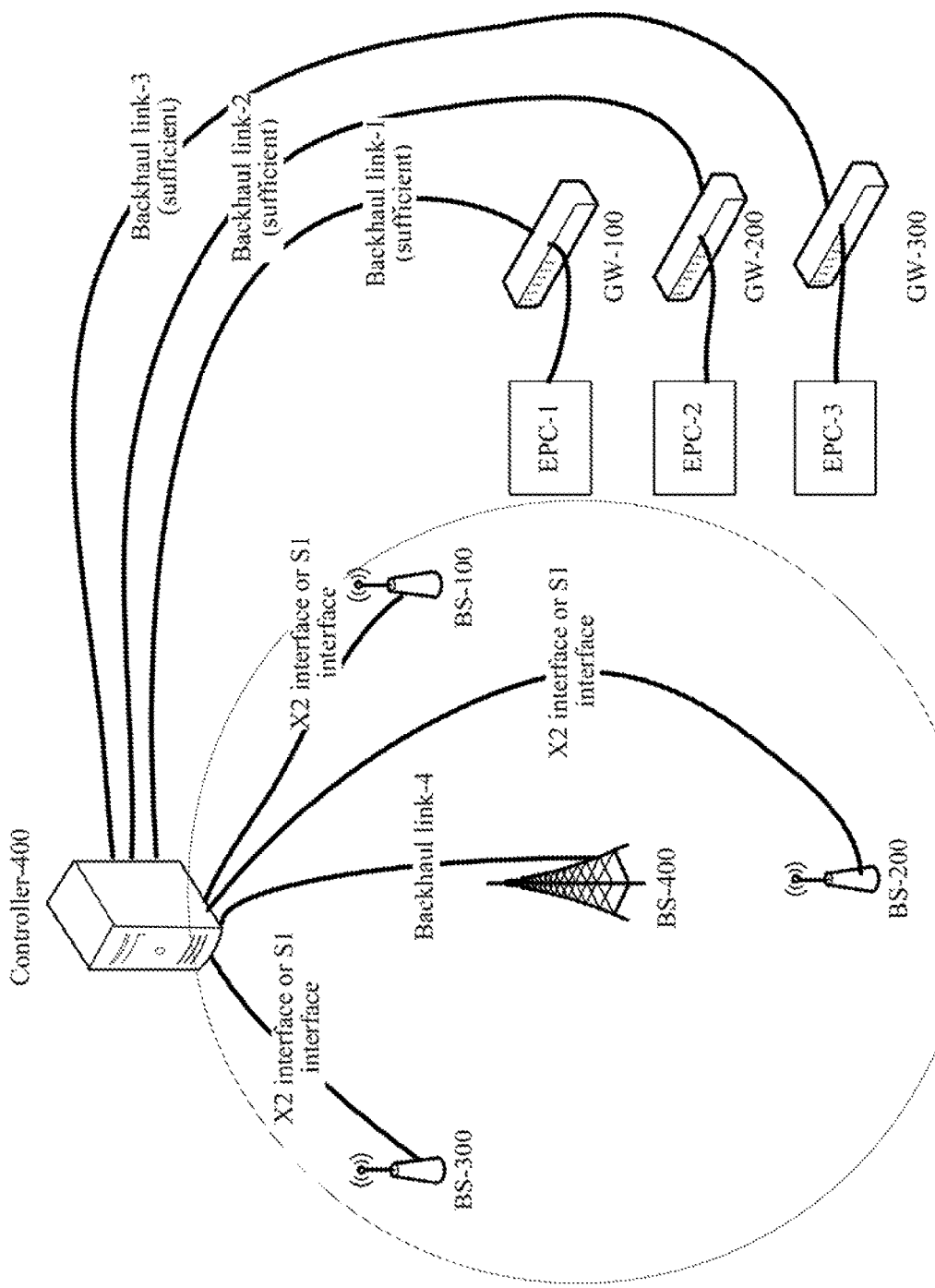
FIG. 6 is a schematic diagram of a deployment solution of a high frequency base station based on a sufficient backhaul according to an embodiment of the present invention.

Referring to FIG. 6, FIG. 6 is a schematic diagram of a deployment solution of a high frequency base station based on a sufficient backhaul according to this embodiment of present invention based on scenario 1 in which capacities of backhauls of low and medium frequency base stations are sufficient. BS-100, BS-200, and BS-300 represent low and medium frequency base stations of multiple telecommunications operators, and work in a low and medium frequency band. BS-400 represents a high frequency base station of a third party company, and works in a high frequency. Controller-400 is a controller of BS-400, and Controller-400 and BS-400 are connected by using backhaul-4. BS-100, BS-200, and BS-300 are connected to Controller-40X by using an X2 interface or S1 interface. EPC-1, EPC-2, and EPC-3 respectively are core networks of BS-100, BS-200, and BS-300. A gateway GW-100 of EPC-1, a gateway GW-200 of EPC-2, and a gateway GW-300 of EPC-3 are connected to Controller-400 respectively by using backhaul-1, backhaul-2, and backhaul-3. Capacities of backhaul-1, backhaul-2, and backhaul-3 are sufficient.

It needs to be pointed out that, although backhaul-1, backhaul-2, and backhaul-3 are connected to Controller-400 in FIG. 6, in an actual application, backhaul-1, backhaul-2, backhaul-3, and Controller-400 are placed in a same geographical location, for example, on a same cabinet. In an actual scenario, BS-100, BS-200, and BS-300 are respectively connected to backhaul-1, backhaul-2, and backhaul-3 by means of a wired medium or a wireless medium, and are separately connected to Controller-400 by using respective an X2 interface or S1 interface. The capacities of backhaul-1, backhaul-2, and backhaul-3 are sent by BS-100, BS-200, and BS-300 to Controller-400 by using the X2 interface or S1 interface.

Figure 7:
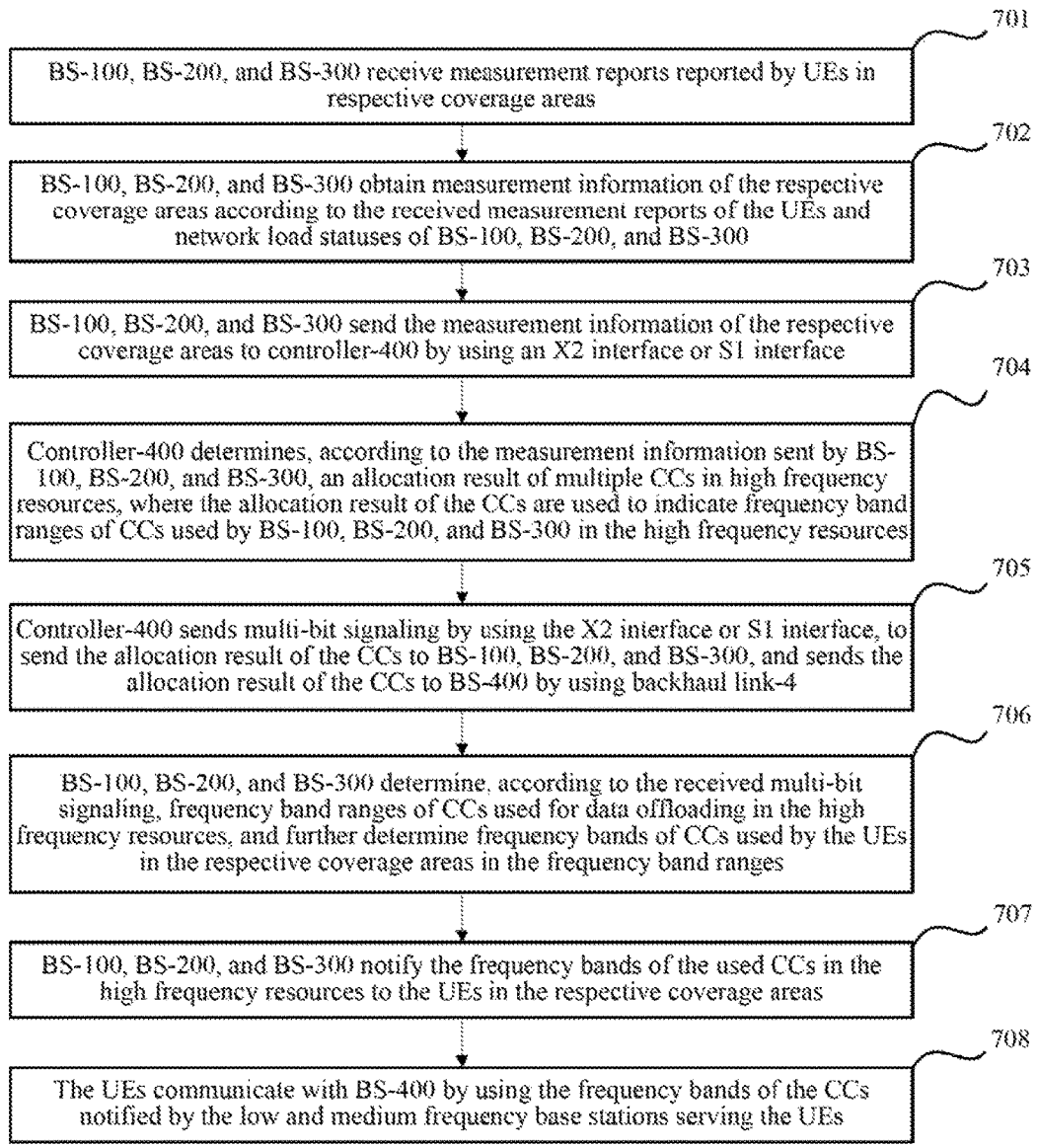
FIG. 7 is a detailed flowchart of providing, by a high frequency base station based on a sufficient backhaul, a data offloading service for UEs according to an embodiment of the present invention.

Based on a system architectural diagram in FIG. 6, assuming that an X2 interface or S1 interface of the high frequency base station is ideal, when backhaul resources between the low and medium frequency base stations and the high frequency base station are sufficient, as shown in FIG. 7, a detailed process of providing, by the high frequency base station, a data offloading service for UEs covered by the low and medium frequency base stations of the multiple telecommunications operators specifically includes the following steps.

Step 701: BS-100, BS-200, and BS-300 receive measurement reports reported by UEs in respective coverage areas.

Step 702: BS-100, BS-200, and BS-300 obtain measurement information of the respective coverage areas according to the received measurement reports of the UEs and network load statuses of BS-100, BS-200, and BS-300.

Specifically, the network load statuses of BS-100, BS-200, and BS-300 include information such as quantities of UEs in the respective coverage areas and services of the UEs. BS-100, BS-200, and BS-300 perform analysis and calculation, with reference to the network load statuses, on the measurement reports reported by the UEs, to obtain the measurement information of the respective coverage areas. The measurement information includes information such as a load status of each low and medium frequency base station, a quantity of UEs covered by each low and medium frequency base station, an ID of the UE, environment information of a link (for example, channel state information) of the UE, so that the UEs in the coverage areas can be better monitored.

Step 703: BS-100, BS-200, and BS-300 send the measurement information of the respective coverage to Controller-400 by using an X2 interface or S1 interface.

Data and/or signaling exchange is performed between BS-100, BS-200, and BS-300 and Controller-400 by using the X2 interface or S1 interface defined in the 3GPP standard. From the perspective of a carrier medium, the X2 interface or S1 interface may implement connection by using a wired medium, for example, fiber, coaxial cable, or network cable; or by using a wireless medium, for example, millimeter wave, or microwave.

Step 704: Controller-400 determines, according to the measurement information sent by BS-100, BS-200, and BS-300, an allocation result of multiple CCs in high frequency resources, where the allocation result of the CCs is used to indicate frequency band ranges of CCs used by BS-100, BS-200, and BS-300 in the high frequency resources.

Because backhaul resources between GW-100, GW-200), and GW-300 and Controller-400 are sufficient, Controller-400 needs to respectively calculate only communication traffic of BS-100, BS-200, and BS-300 in each CC according to the received measurement information, and determine the frequency band ranges of the CCs used by BS-100, BS-200, and BS-300 in the owned high frequency resources.

Step 705: Controller-400 sends multi-bit signaling by using an X2 interface or S1 interface, to send the allocation result of the CCs to BS-100, BS-200, and BS-300, and sends the allocation result of the CCs to BS-400 by using backhaul-4.

Because the X2 interface or S1 interface between Controller-400 and BS-100, BS-200, and BS-300 are ideal, the X2 interface or S1 interface can carry the allocation result of all CCs. Therefore, in this embodiment of the present invention, after Controller-400 divides the owned high frequency CCs for the low and medium frequency base stations, which CC is used by each UE in the coverage area of each low and medium frequency base station is determined by the low and medium frequency base station serving the UE. Controller-400 notifies, over the X2 interface or S1 interface by using multi-bit signaling, a frequency band range of a CC used by each low and medium frequency base station in the high frequency resources.

Step 706: BS-100, BS-200, and BS-300 determine, according to the received multi-bit signaling, frequency band ranges of CCs used for data offloading in the high frequency resources, and further determine frequency bands of CCs used by the UEs in the respective coverage areas in the frequency band ranges.

Specifically, after determining, according to the received multi-bit signaling, which high frequency CCs are used for data offloading, BS-100, BS-200, and BS-300 further determine, according to the measurement report reported by each UE, which CC or CCs is or are specifically used by each UE in the allocated high frequency CCs.

Step 707: BS-100, BS-200, and BS-300 notify the frequency bands of the used CCs in the high frequency resources to the UEs in the respective coverage areas.

Specifically, BS-100, BS-200, and BS-300 may fill MAC mapping tables according to the frequency bands of the CCs used by the UEs in the respective coverage areas in the high frequency resources, add the MAC mapping tables to MAC information in downlink data packets sent to the UEs, and send the downlink data packets to the UEs by using a PDSCH.

Alternatively, BS-100, BS-200, and BS-300 may directly notify the frequency bands of the used CCs to the UEs by using signaling.

Step 708: The UEs communicate with BS-400 by using the frequency bands of the CCs notified by the low and medium frequency base stations serving the UEs.

Embodiment 6

Figure 8:
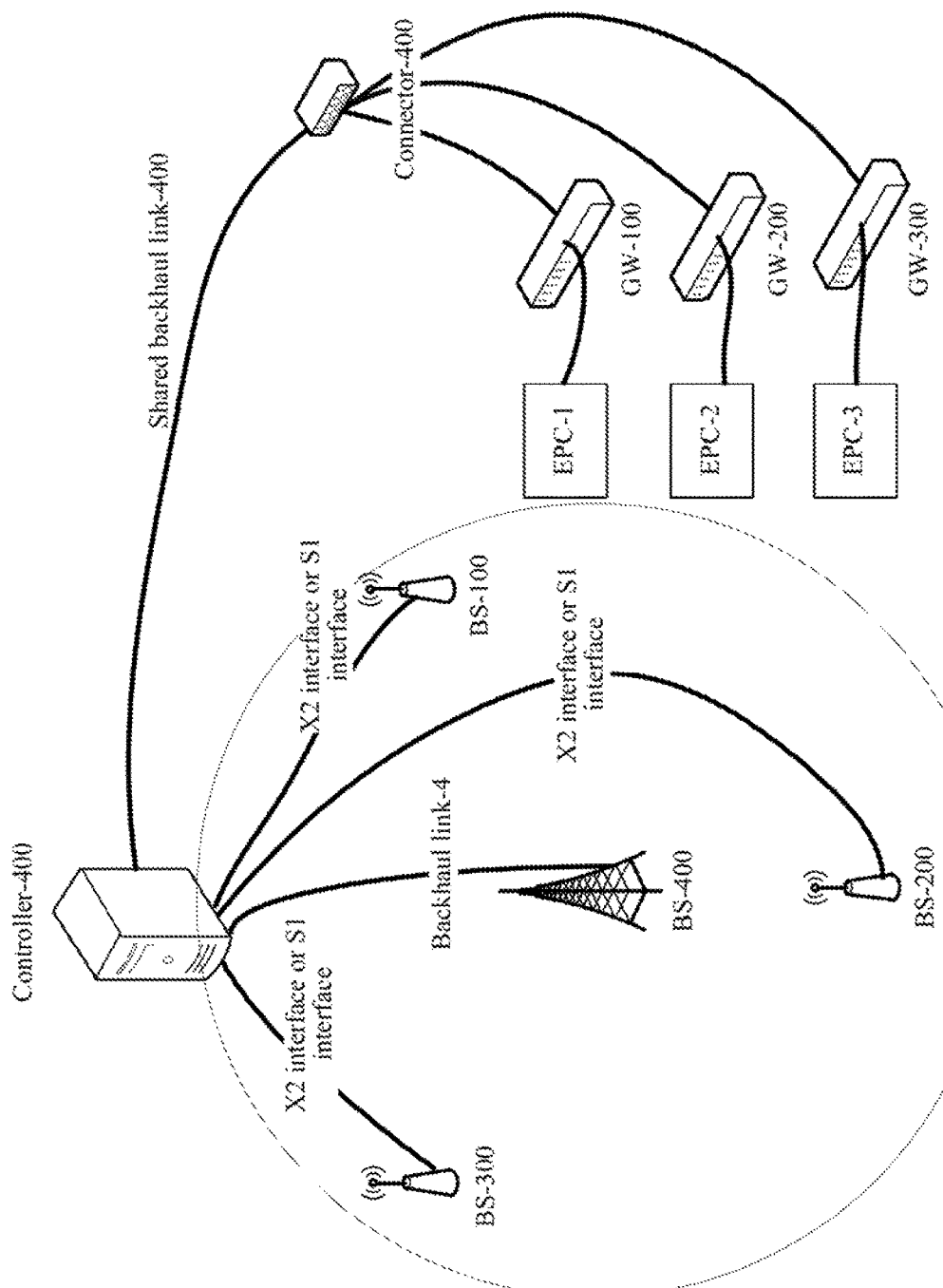
FIG. 8 is a schematic diagram of a deployment solution of a high frequency base station based on a shared backhaul according to an embodiment of the present invention.

Referring to FIG. 8, FIG. 8 is a schematic diagram of a solution of deploying a high frequency base station based on a shared backhaul according to this embodiment of the present invention based on scenario 2 in which multiple low and medium frequency base stations share a backhaul provided by a high frequency base station. BS-100, BS-200, and BS-300 represent low and medium frequency base stations of multiple telecommunications operators, and work in a low and medium frequency band. BS-400 represents a high frequency base station of a third party company, and works in a high frequency band. Controller-400 is a controller of BS-400, and Controller-400 and BS-400 are connected by using backhaul-4. BS-100, BS-200, and BS-300 are connected to Controller-400 by using an X2 interface or S1 interface. The X2 interface or S1 interface are ideal. EPC-1, EPC-2, and EPC-3 respectively are core networks of BS-100, BS-200, and BS-300. A gateway GW-100 of EPC-1, a gateway GW-200 of EPC-2, and a gateway GW-300 of EPC-3 are connected to a connector Connector-400, and then, Connector-400 is connected to Controller-400 by using a shared backhaul link Shared backhaul-400 provided by Controller-400.

It needs to be pointed out that, in an actual scenario, BS-100. BS-200, and BS-300 are separately connected to the Shared backhaul-400 by using a wired medium or a wireless medium, and are connected to Controller-400 by using respective an X2 interface or S1 interface. Percentages that are accounted for by BS-100, BS-200, and BS-300 and that are of Shared backhaul-400 are sent by BS-100, BS-200, and BS-300 to Controller-400 by using the X2 interface or S1 interface.

Figure 9:
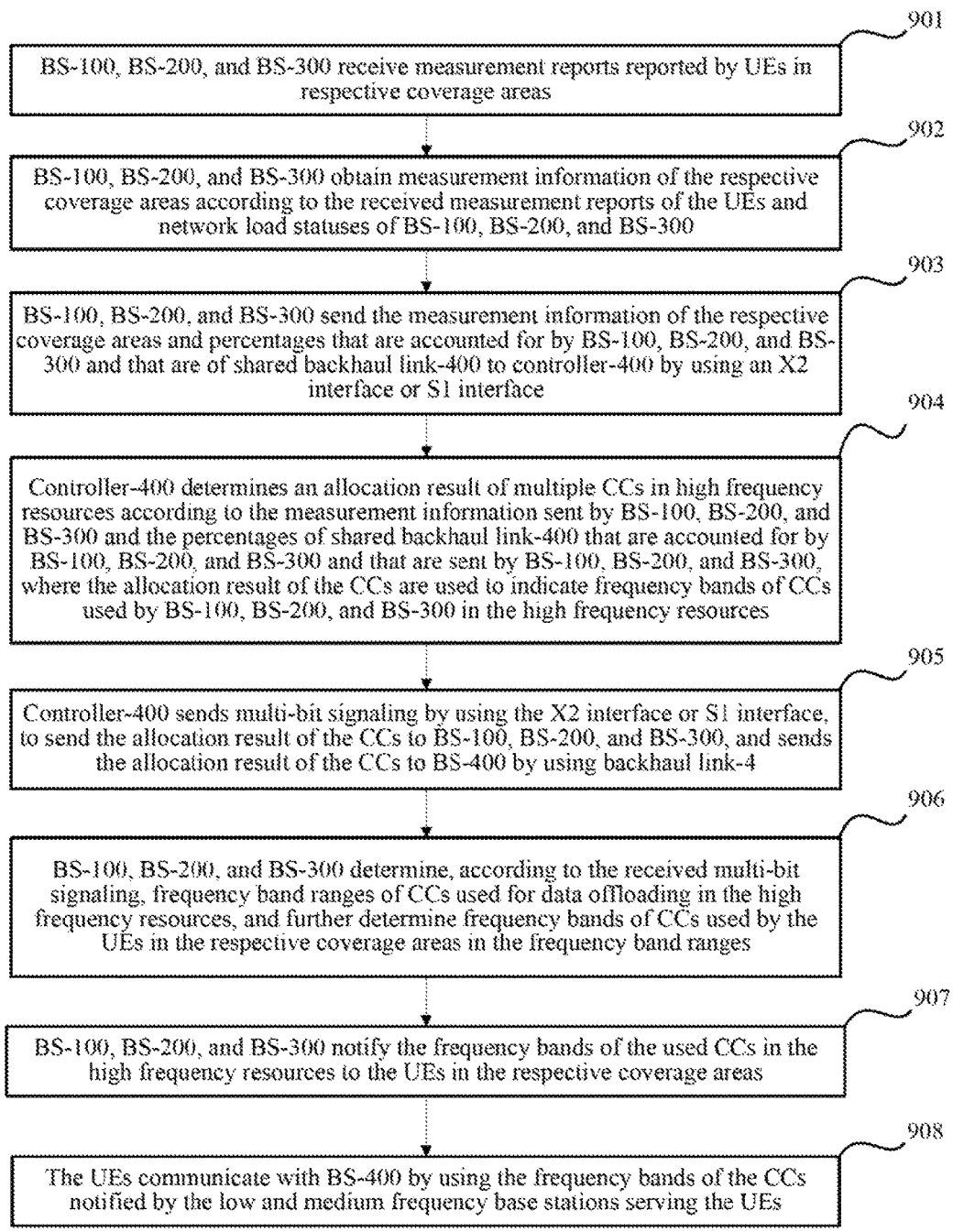
FIG. 9 is a detailed flowchart of providing, by a high frequency base station based on a shared backhaul, a data offloading service for UEs according to an embodiment of the present invention.

Based on a system architectural diagram in FIG. 8, assuming that an X2 interface or S1 interface of the high frequency base station is ideal, when low and medium frequency base stations share a backhaul resource provided by the high frequency base station, as shown in FIG. 9, a detailed process of providing, by the high frequency base station, a data offloading service for UEs covered by the low and medium frequency base stations of the multiple telecommunications operators specifically includes the following steps.

Step 901: BS-100, BS-200, and BS-300 receive measurement reports reported by UEs in respective coverage areas.

Step 902: BS-100, BS-200, and BS-300 obtain measurement information of the respective coverage areas according to the received measurement reports of the UEs and network load statuses of BS-100, BS-200, and BS-300.

Specifically, the network load statuses of BS-100, BS-200, and BS-300 include information such as quantities of UEs in the respective coverage areas and services of the UEs. BS-100, BS-200, and BS-300 perform analysis and calculation, with reference to the network load statuses, on the measurement reports reported by the UEs, to obtain the measurement information of the respective coverage areas. The measurement information includes information such as a load status of each low and medium frequency base station, a quantity of UEs covered by each low and medium frequency base station, an ID of the UE, environment information of a link (for example, channel state information) of the UE, so that the UEs in the coverage areas can be better monitored.

Step 903: BS-100, BS-200, and BS-300 send the measurement information of the respective coverage areas and percentages that are accounted for by BS-100, BS-200, and BS-300 and that are of Shared backhaul-400 to Controller-400 by using an X2 interface or S1 interface.

Data and/or signaling exchange is performed between BS-100, BS-200, and BS-300 and Controller-400 by using the X2 interface or S1 interface defined in the 3GPP standard. From the perspective of a carrier medium, the X2 interface or S1 interface may implement connection by using a wired medium, for example, fiber, coaxial cable, or network cable, or by using a wireless medium, for example, millimeter wave, or microwave.

Step 904: Controller-400 determines an allocation result of multiple CCs in high frequency resources according to the measurement information sent by BS-100, BS-200, and BS-300 and the percentages that are accounted for by BS-100, BS-200, and BS-300, that are sent by BS-100, BS-200, and BS-300, and that are of Shared backhaul-400, where the allocation result of the CCs is used to indicate frequency bands of CCs used by BS-100, BS-200, and BS-300 in the high frequency resources.

Step 905: Controller-400 sends multi-bit signaling by using an X2 interface or S1 interface, to send the allocation result of the CCs to BS-100, BS-200, and BS-300, and sends the allocation result of the CCs to BS-400 by using backhaul-4.

Because the X2 interface or S1 interface between Controller-400 and BS-100, BS-200, and BS-300 are ideal, the X2 interface or S1 interface can carry the allocation result of all CCs. Therefore, in this embodiment of the present invention, after Controller-400 divides the owned high frequency CCs for the low and medium frequency base stations, which CC is used by each UE in the coverage area of each low and medium frequency base station is determined by the low and medium frequency base station serving the UE. Controller-400 notifies, over the X2 interface or S1 interface by using multi-bit signaling, a frequency band range of a CC used by each low and medium frequency base station in the high frequency resources.

Step 906: BS-100, BS-200, and BS-300 determine, according to the received multi-bit signaling, frequency band ranges of CCs used for data offloading in the high frequency resources, and further determine frequency bands of CCs used by the UEs in the respective coverage areas in the frequency band ranges.

Specifically, after determining, according to the received multi-bit signaling, which high frequency CCs are used for data offloading, BS-100, BS-200, and BS-300 further determine, according to the measurement report reported by each UE, which CC or CCs is or are specifically used by each UE in the allocated high frequency CCs.

Step 907: BS-100, BS-200, and BS-300 notify the frequency bands of the used CCs in the high frequency resources to the UEs in the respective coverage areas.

Specifically. BS-100, BS-200, and BS-300 may fill MAC mapping tables according to the frequency bands of the CCs used by the UEs in the respective coverage areas in the high frequency resources, add the MAC mapping tables to MAC information in downlink data packets sent to the UEs, and send the downlink data packets to the UEs by using a PDSCH.

Alternatively, BS-100, BS-200, and BS-300 may directly notify the frequency bands of the used CCs to the UEs by using signaling.

Step 908: The UEs communicate with BS-400 by using the frequency bands of the CCs notified by the low and medium frequency base stations serving the UEs.

Embodiment 7

Figure 10:
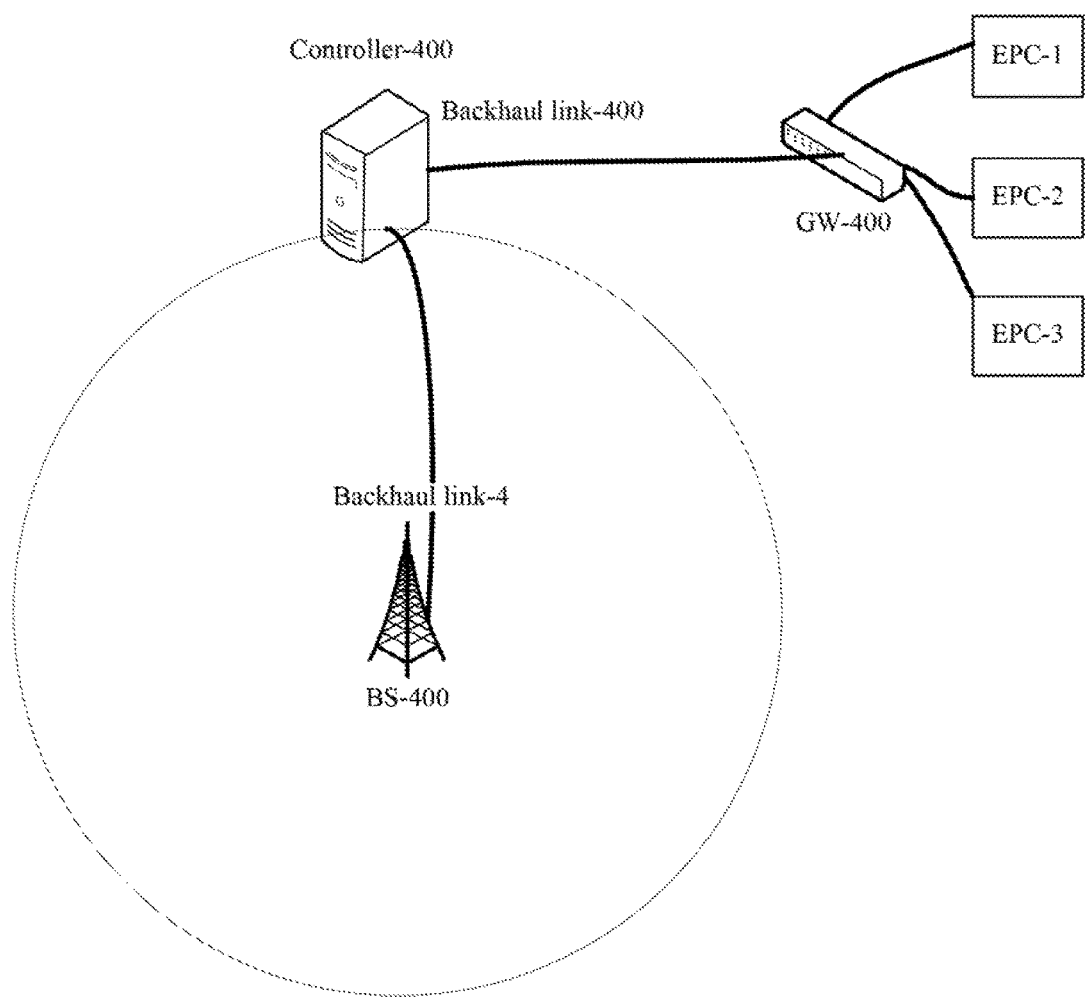
FIG. 10 is a schematic diagram of a deployment solution of a high frequency base station based on a shared RAN and backhaul according to an embodiment of the present invention.

Referring to FIG. 10, FIG. 10 is a schematic diagram of a solution of deploying a high frequency base station based on a shared RAN and backhaul according to this embodiment of the present invention based on scenario 3 in which multiple operators share a RAN and backhaul provided by a high frequency base station. BS-400 represents a high frequency base station of a third party company and works in a high frequency band. Controller-400 is a controller of BS-400. Controller-400 and BS-400 are connected by using backhaul-4. EPC1, EPC2, and EPC3 are core networks of BS-400. A gateway GW-400 of EPC1, EPC2, and EPC3 is connected to Controller-400 by using backhaul-400. Telecommunications operators share a RAN and backhaul-400 provided by BS-400.

Figure 11:
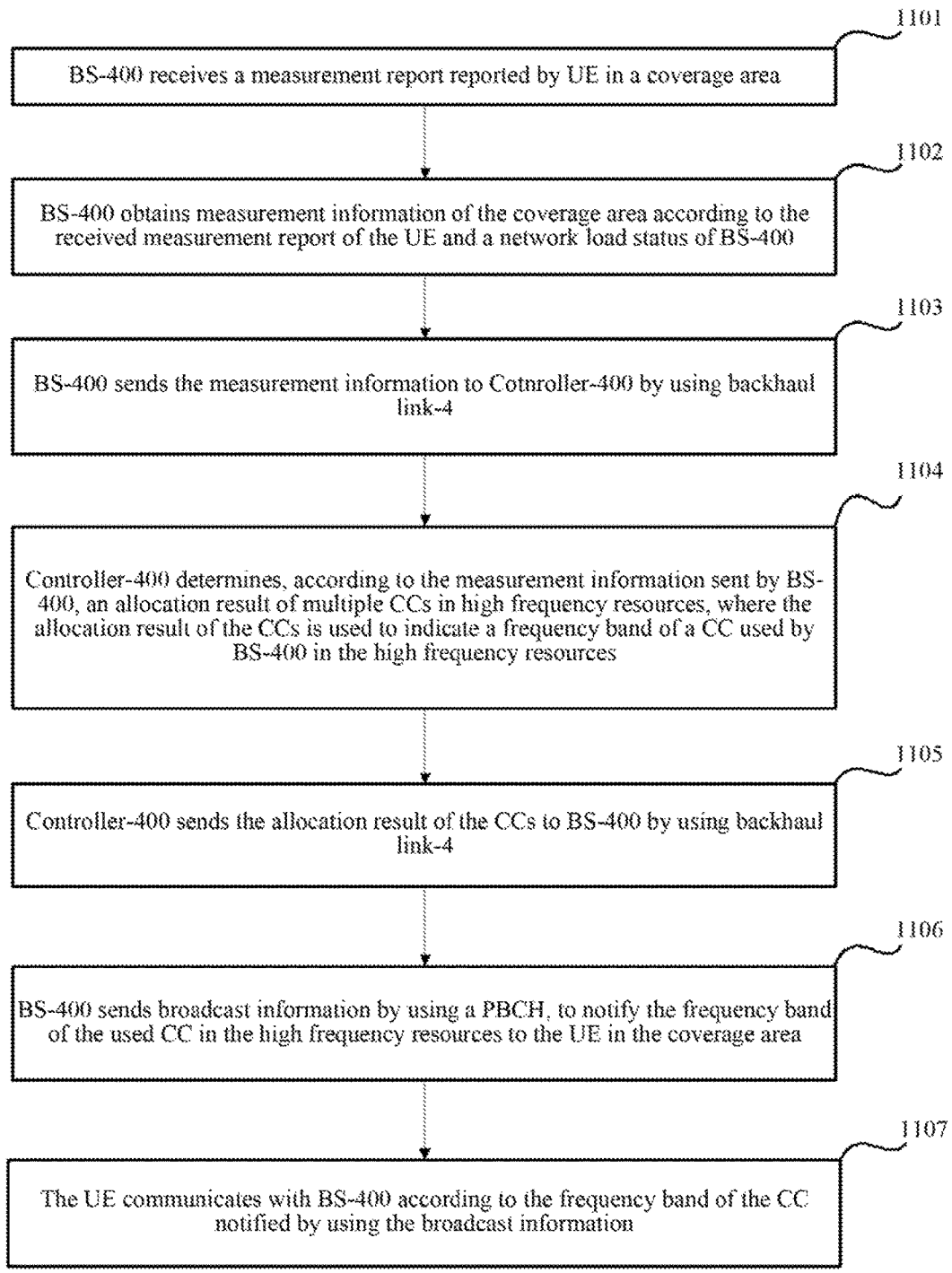
FIG. 11 is a detailed flowchart of providing, by a high frequency base station based on a shared RAN and backhaul, a data offloading service for UEs according to an embodiment of the present invention.

Based on a system architectural diagram in FIG. 10, when the telecommunications operators share RAN and backhaul resources provided by the high frequency base station of the third party company, as shown in FIG. 11, a detailed process of providing, by the high frequency base station of the third party company, a data offloading service for UEs of the telecommunications operators specifically includes the following steps:

Step 1101: BS-400 receives a measurement report reported by UE in a coverage area.

Step 1102: BS-400 obtains measurement information of the coverage area according to the received measurement report of the UE and a network load status of BS-400.

Specifically, the network load status of BS-400 includes information such as a quantity of UEs in the coverage area and a service of each UE. BS-400 performs analysis and calculation, with reference to the network load status, on the measurement report reported by the UE, to obtain the measurement information of the coverage area. The measurement information includes information such as a load status of each low and medium frequency base station, a quantity of UEs covered by each low and medium frequency base station, an ID of the UE, environment information of a link (for example, channel state information) of the UE, so that the UEs in the coverage area can be better monitored.

Step 1103: BS-400 sends the measurement information to Controller-400 by using backhaul-4.

Step 1104: Controller-400 determines, according to the measurement information sent by BS-400, an allocation result of multiple CCs in high frequency resources, where the allocation result of the CCs is used to indicate a frequency band of a CC used by BS-400 in the high frequency resources.

Step 1105: Controller-400 sends the allocation result of the CCs to BS-400 by using backhaul-4.

Step 1106: BS-400 sends broadcast information by using a PBCH, to notify the frequency band of the used CC in the high frequency resources to the UE in the coverage area.

Step 1107: The UE communicates with BS-400 according to the frequency band of the CC notified by using the broadcast information.

Embodiment 8

Figure 12:
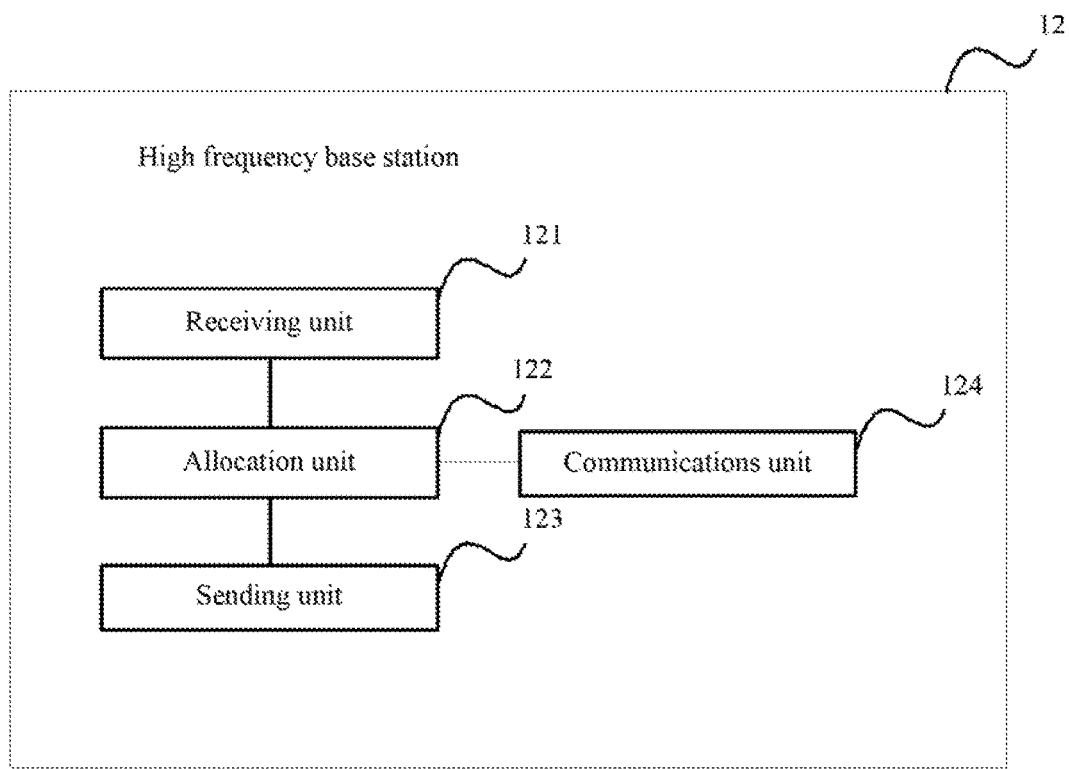
FIG. 12 is a schematic structural diagram of a high frequency base station according to an embodiment of the present invention.

Referring to FIG. 12, this embodiment of the present invention provides a high frequency base station 12, configured to implement the process, shown in FIG. 1 of the present invention, of allocating multiple high frequency CCs.

The high frequency base station 12 works in a high frequency band, and includes:

a receiving unit 121, configured to receive measurement information sent by low and medium frequency base stations of multiple telecommunications operators or measurement reports sent by first UEs of multiple telecommunications operators, where the low and medium frequency base stations work in a low and medium frequency band, and the first UEs are served by the high frequency base station 12;

an allocation unit 122, configured to allocate multiple CCs included in high frequency resources to the low and medium frequency base stations or the first UEs according to the measurement information or the measurement reports, to obtain an allocation result; and a sending unit 123, configured to notify the allocation result to the low and medium frequency base stations or the first UEs.

The measurement information includes information such as a load status and channel state information of each low and medium frequency base station, a quantity of second UEs served by the low and medium frequency base station, and an ID of the second UE.

Optionally, before the allocation unit 122 allocates the multiple CCs included in the high frequency resources to the low and medium frequency base stations according to the measurement information, the receiving unit 121 is further configured to:

receive capacities that are sent by the low and medium frequency base stations and that are of first backhauls of the low and medium frequency base stations, where the first backhauls are provided by the low and medium frequency base stations and connect the high frequency base station 12 and the low and medium frequency base stations.

Correspondingly, the allocation unit 122 is specifically configured to:

allocate, according to the measurement information and the capacities of the first backhauls, the multiple CCs included in the high frequency resources, to obtain the allocation result.

Optionally, before the allocation unit 122 allocates the multiple CCs included in the high frequency resources to the low and medium frequency base stations according to the measurement information, the receiving unit 121 is further configured to:

receive percentages that are sent by the low and medium frequency base stations, that are accounted for by the low and medium frequency base stations, and that are of a second backhaul of the high frequency base station 12, where the second backhaul is provided by the high frequency base station 12 and connects the high frequency base station 12 and the low and medium frequency base stations.

Correspondingly, the allocation unit 122 is specifically configured to:

allocate, according to the measurement information and the percentages that are accounted for by the low and medium frequency base stations and that are of the second backhaul, the multiple CCs included in the high frequency resources, to obtain the allocation result.

Optionally, the allocation unit 122 is specifically configured to:

allocate frequency band ranges of used CCs in the high frequency resources to the low and medium frequency base stations according to the measurement information; or allocate frequency bands of used CCs in the high frequency resources to the first UEs according to the measurement reports.

Further, after allocating the frequency band ranges of the used CCs in the high frequency resources to the low and medium frequency base stations, the allocation unit 122 is further configured to:

allocate frequency bands of used CCs in the frequency band ranges to the second UEs served by the low and medium frequency base stations.

Optionally, when notifying the allocation result to the low and medium frequency base stations, the sending unit 123 is specifically configured to:

send one-bit signaling by using an X2 interface or S1 interface, to notify the allocation result to the low and medium frequency base stations, where the one-bit signaling is used to notify the low and medium frequency base stations whether to use one or more CCs included in the high frequency resources; or send multi-bit signaling by using an X2 interface or S1 interface, to notify the allocation result to the low and medium frequency base stations, where the multi-bit signaling is used to notify the frequency band ranges of the used CCs in the high frequency resources to the low and medium frequency base stations.

Specifically, after sending the one-bit signaling to notify the allocation result to the low and medium frequency base stations, the sending unit 123 is further configured to:

notify, by using signaling or downlink data packets, the allocation result to the second UEs served by the low and medium frequency base stations, where the signaling and downlink data packets are used to indicate the frequency bands of the CCs used by the second UEs in the high frequency resources.

Specifically, when notifying, by using the downlink data packets, the allocation result to the second UEs served by the low and medium frequency base stations, the sending unit 123 is specifically configured to:

fill a MAC mapping table according to the allocation result, add the MAC mapping table to MAC information in the downlink data packets, and send the downlink data packets to the second UEs by using a PDSCH.

Optionally, when notifying the allocation result to the first UEs, the sending unit 123 is specifically configured to:

send broadcast information carrying the allocation result to the first UEs by using a PBCH.

The high frequency base station 12 further includes:

a communications unit 124, configured to: after the sending unit 123 notifies the allocation result to the low and medium frequency base stations or the first UEs, communicate, based on the frequency bands of the CCs indicated in the allocation result, with the second UEs served by the low and medium frequency base stations or with the first UEs.

Embodiment 9

Figure 13:
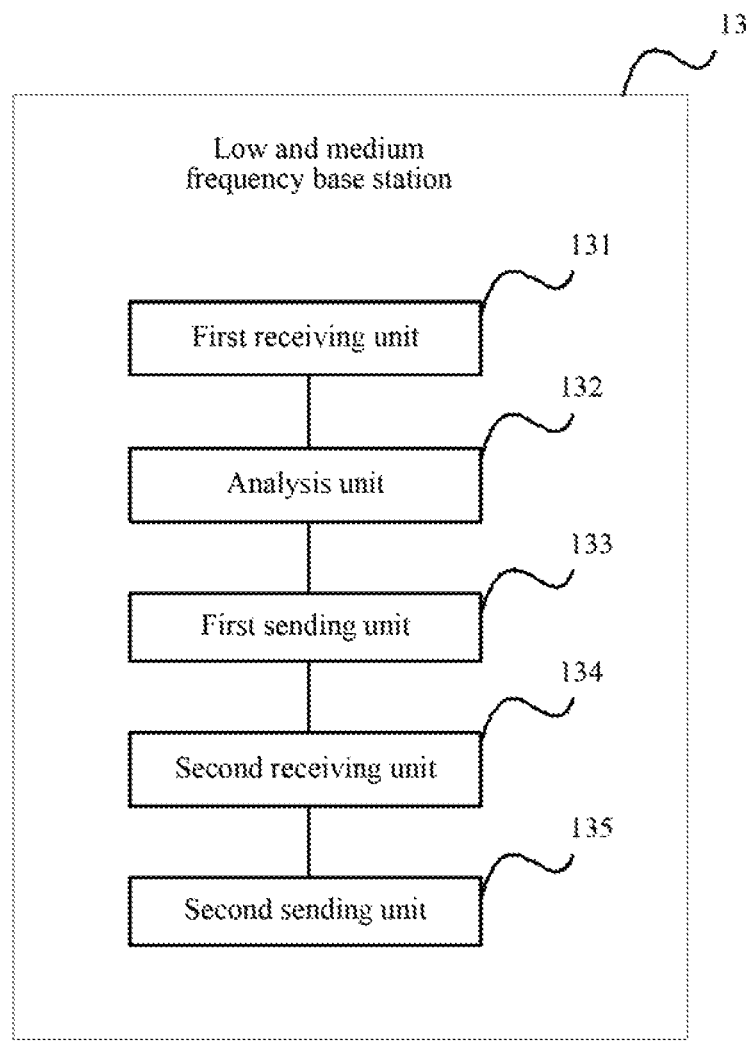
FIG. 13 is a schematic structural diagram of a low and medium frequency base station according to an embodiment of the present invention.

Referring to FIG. 13, this embodiment of the present invention provides a low and medium frequency base station 13, configured to implement the process, shown in FIG. 2 of the present invention, of notifying UE of multiple high frequency CCs allocated by a high frequency base station.

The low and medium frequency base station 13 belongs to any one of multiple telecommunications operators, works in a low and medium frequency band, and includes:

a first receiving unit 131, configured to receive a measurement report sent by UE served by the low and medium frequency base station 13;

an analysis unit 132, configured to obtain measurement information according to the measurement report and a network load status of the low and medium frequency base station 13;

a first sending unit 133, configured to send the measurement information to a high frequency base station, where the high frequency base station works in a high frequency;

a second receiving unit 134, configured to receive an allocation result sent by the high frequency base station, where the allocation result is obtained by the high frequency base station after the high frequency base station allocates multiple CCs included in high frequency resources to the low and medium frequency base station 13 according to the measurement information; and a second sending unit 135, configured to notify the allocation result to the UE.

The network load status of the low and medium frequency base station 13 includes information such as a quantity of UEs in a coverage area of the low and medium frequency base station 13 and a service of each UE. The measurement information includes information such as a load status and channel state information of the low and medium frequency base station 13, a quantity of UEs served by the low and medium frequency base station 13, and an ID of the UE.

Optionally, before the second receiving unit 134 receives the allocation result sent by the high frequency base station, the first sending unit 133 is further configured to:

send a capacity of a first backhaul of the low and medium frequency base station 13 to the high frequency base station, where the first backhaul is provided by the low and medium frequency base station 13, and connects the low and medium frequency base station 13 and the high frequency base station; or send a percentage that is accounted for by the low and medium frequency base station 13 and that is of a second backhaul of the high frequency base station to the high frequency base station, where the second backhaul is provided by the high frequency base station and connects the low and medium frequency base station 13 and the high frequency base station.

Optionally, the second receiving unit 134 is specifically configured to receive one-bit signaling that is sent by the high frequency base station by using an X2 interface or S1 interface and that carries the allocation result; and determine, based on the one-bit signaling, whether to use one or more CCs included in the high frequency resources; and correspondingly, the second sending unit 135 is specifically configured to:

forward the one-bit signaling carrying the allocation result to the UE, so that the UE determines, according to the one-bit signaling, whether to receive signaling or a downlink data packet that is sent by the high frequency base station and that carries the allocation result, where the signaling and the downlink data packet are used to indicate a frequency band of a CC used by the UE in the high frequency resources.

Optionally, the second receiving unit 134 is specifically configured to receive multi-bit signaling that is sent by the high frequency base station by using an X2 interface or S1 interface and that carries the allocation result; and determine, based on the multi-bit signaling, a frequency band range of a used CC in the high frequency resources; and correspondingly, the second sending unit 135 is specifically configured to:

allocate a frequency band of a used CC in the frequency band range to the UE based on the determined frequency band range; and notify the frequency band of the used CC in the frequency band range to the UE.

Specifically, when notifying the frequency band of the used CC in the frequency band range to the UE, the second sending unit 135 may notify the frequency band of the used CC in the frequency band range to the UE by using signaling; or may notify the frequency band of the used CC in the frequency band range to the UE by using a downlink data packet.

Specifically, when notifying the frequency band of the used CC in the frequency band range to the UE by using the downlink data packet, the second sending unit 135 may fill a MAC mapping table according to the frequency band that is allocated to the UE and that is of the used CC in the frequency band range, add the MAC mapping table to MAC information of the downlink data packet, and send the downlink data packet to the UE by using a PDSCH.

Embodiment 10

Figure 14:
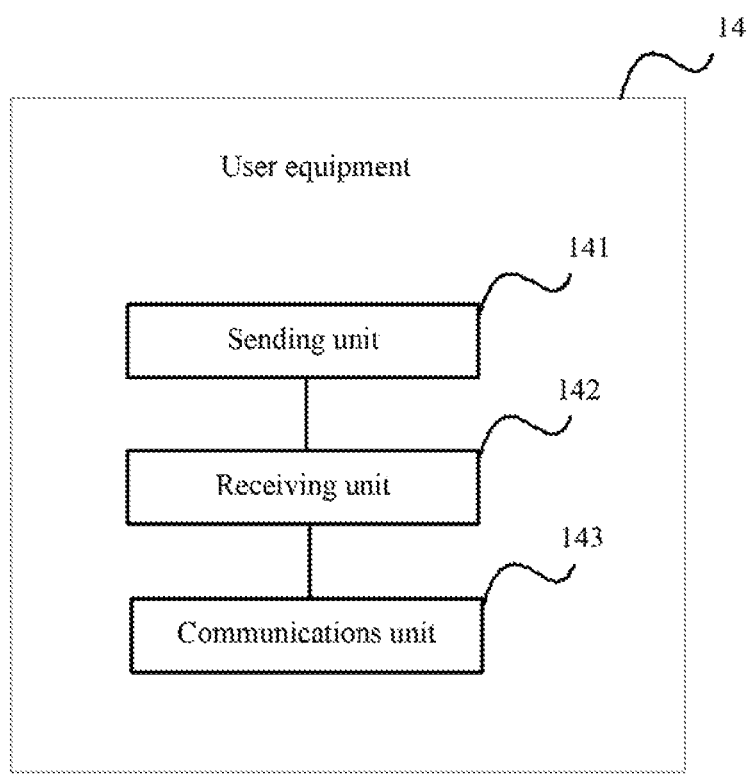
FIG. 14 is a schematic structural diagram of UE according to an embodiment of the present invention.

Referring to FIG. 14, this embodiment of the present invention provides UE 14, configured to implement the process, shown in FIG. 3 of the present invention, of communicating, by UE, with a high frequency base station.

The UE 14 includes:

a sending unit 141, configured to send a measurement report to a high frequency base station or to a low and medium frequency base station of any one of multiple telecommunications operators, where the high frequency base station works in a high frequency band, and the low and medium frequency base station works in a low and medium frequency band; and a receiving unit 142, configured to receive an allocation result sent by the high frequency base station or the low and medium frequency base station, where the allocation result is obtained by the high frequency base station or the low and medium frequency base station after the high frequency base station or the low and medium frequency base station allocates multiple CCs included in high frequency resources to the UE 14 according to the measurement report.

Optionally, when receiving the allocation result sent by the high frequency base station, the receiving unit 142 is specifically configured to:

when receiving one-bit signaling that is forwarded by the low and medium frequency base station and that carries the allocation result, and determining, according to the one-bit signaling, to receive signaling or a downlink data packet that is sent by the high frequency base station and that carries the allocation result, receive the signaling or downlink data packet, where the signaling and downlink data packet are used to indicate a frequency band of a CC used by the UE in the high frequency resources; or receive broadcast information that is sent by the high frequency base station by using a PBCH and that carries the allocation result.

Optionally, when receiving the allocation result sent by the low and medium frequency base station, the receiving unit 142 is specifically configured to:

receive signaling or a downlink data packet sent by the low and medium frequency base station, where the signaling and downlink data packet are used to indicate a frequency band of a CC used by the UE 14 in the high frequency resources.

The UE 14 further includes:

a communications unit 143, configured to: after the receiving unit 142 receives the allocation result sent by the high frequency base station or the low and medium frequency base station, communicate with the high frequency base station based on the frequency band of the CC indicated in the allocation result.

Embodiment 11

Figure 15:
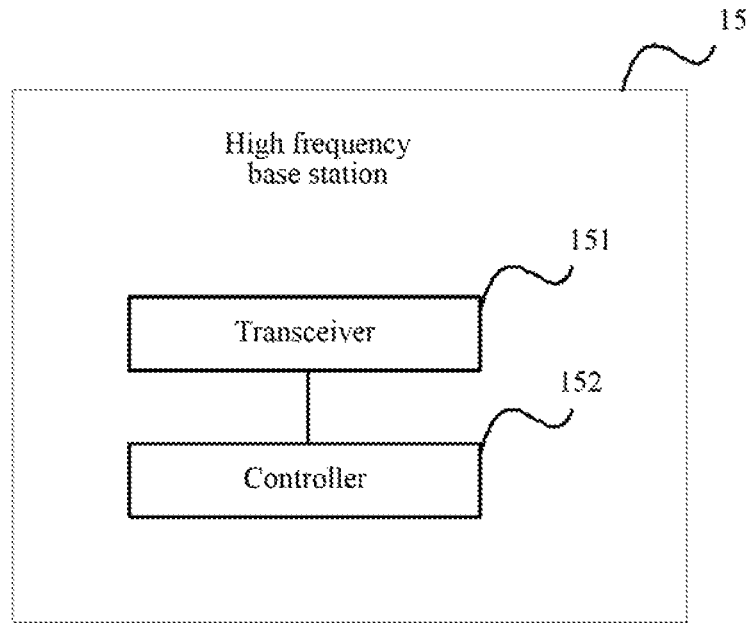
FIG. 15 is a schematic structural diagram of a high frequency base station according to an embodiment of the present invention.

Referring to FIG. 15, this embodiment of the present invention provides a high frequency base station 15. The high frequency base station 15 works in a high frequency band, and includes:

a transceiver 151, configured to receive measurement information sent by low and medium frequency base stations of multiple telecommunications operators or measurement reports sent by first UEs of multiple telecommunications operators, where the low and medium frequency base stations work in a low and medium frequency band, and the first UEs are served by the high frequency base station 15; and a controller 152, configured to allocate multiple CCs included in high frequency resources to the low and medium frequency base stations or the first UEs according to the measurement information or the measurement reports, to obtain an allocation result, where the transceiver 151 is further configured to notify the allocation result to the low and medium frequency base stations or the first UEs.

The measurement information includes information such as a load status and channel state information of each low and medium frequency base station, a quantity of second UEs served by the low and medium frequency base station, and an ID of the second UE.

Optionally, before the controller 152 allocates the multiple CCs included in the high frequency resources to the low and medium frequency base stations according to the measurement information, the transceiver 151 is further configured to:

receive capacities that are sent by the low and medium frequency base stations and that are of first backhauls of the low and medium frequency base stations, where the first backhauls are provided by the low and medium frequency base stations and connect the high frequency base station 15 and the low and medium frequency base stations; and correspondingly, the controller 152 is specifically configured to:

allocate the multiple CCs included in the high frequency resources according to the measurement information and the capacities of the first backhauls, to obtain the allocation result.

Optionally, before the controller 152 allocates the multiple CCs included in the high frequency resources to the low and medium frequency base stations according to the measurement information, the transceiver 151 is further configured to:

receive percentages that are sent by the low and medium frequency base stations, that are accounted for by the low and medium frequency base stations, and that are of a second backhaul of the high frequency base station 15, where the second backhaul is provided by the high frequency base station 15 and connects the high frequency base station 15 and the low and medium frequency base stations; and correspondingly, the controller 152 is specifically configured to:

allocate the multiple CCs included in the high frequency resources according to the measurement information and the percentages that are accounted for by the low and medium frequency base stations and that are of the second backhaul, to obtain the allocation result.

Specifically, the controller 152 may allocate frequency band ranges of used CCs in the high frequency resources to the low and medium frequency base stations according to the measurement information, or may allocate frequency bands of used CCs in the high frequency resources to the first UEs according to the measurement reports.

Specifically, after allocating the frequency band ranges of the used CCs in the high frequency resources to the low and medium frequency base stations, the controller 152 is further configured to:

allocate frequency bands of used CCs in the frequency band ranges to the second UEs served by the low and medium frequency base stations.

Specifically, when notifying the allocation result to the low and medium frequency base stations, the transceiver 151 may send one-bit signaling by using an X2 interface or S1 interface, to notify the allocation result to the low and medium frequency base stations, where the one-bit signaling is used to notify the low and medium frequency base stations whether to use one or more CCs included in the high frequency resources. Alternatively, the transceiver 151 may send multi-bit signaling by using an X2 interface or S1 interface, to notify the allocation result to the low and medium frequency base stations, where the multi-bit signaling is used to notify the frequency band ranges of the used CCs in the high frequency resources to the low and medium frequency base stations.

After sending the one-bit signaling to notify the allocation result to the low and medium frequency base stations, the transceiver 151 is further configured to:

notify, by using signaling, the allocation result to the second UEs served by the low and medium frequency base stations; or notify, by using downlink data packets, the allocation result to the second UEs served by the low and medium frequency base stations, where the signaling and the downlink data packets are used to indicate the frequency bands of the CCs used by the second UEs in the high frequency resources.

When notifying, by using the downlink data packets, the allocation result to the second UEs served by the low and medium frequency base stations, the transceiver 151 is specifically configured to:

fill a MAC mapping table according to the allocation result, add the MAC mapping table to MAC information in the downlink data packets, and send the downlink data packets to the second UEs by using a PDSCH.

When notifying the allocation result to the first UEs, the transceiver 151 is specifically configured to:

send broadcast information carrying the allocation result to the first UEs by using a PBCH.

Further, the transceiver 151 is further configured to:

after notifying the allocation result to the low and medium frequency base stations or the first UEs, communicate, based on the frequency bands of the CCs indicated in the allocation result, with the second UEs served by the low and medium frequency base stations or with the first UEs.

Embodiment 12

Figure 16:
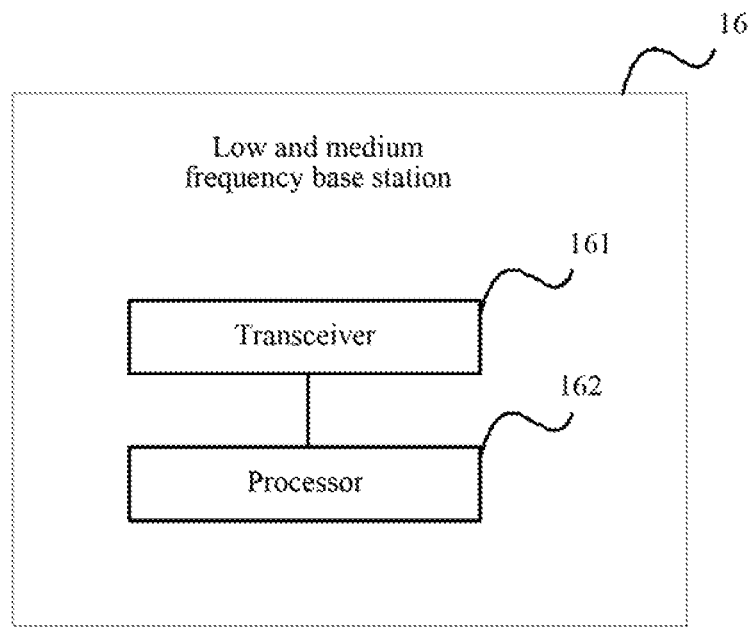
FIG. 16 is a schematic structural diagram of a low and medium frequency base station according to an embodiment of the present invention.

Referring to FIG. 16, this embodiment of the present invention provides a low and medium frequency base station 16. The low and medium frequency base station 16 belongs to any one of multiple telecommunications operators, works in a low and medium frequency band, and includes:

a transceiver 161, configured to receive a measurement report sent by UE served by the low and medium frequency base station 16; and a processor 162, configured to obtain measurement information according to the measurement report and a network load status of the low and medium frequency base station, where the transceiver 161 is further configured to: send the measurement information to a high frequency base station, where the high frequency base station works in a high frequency; receive an allocation result sent by the high frequency base station, where the allocation result is obtained by the high frequency base station after the high frequency base station allocates multiple CCs included in high frequency resources to the low and medium frequency base station according to the measurement information; and notify the allocation result to the UE.

The network load status of the low and medium frequency base station 16 includes information such as a quantity of UEs in a coverage area of the low and medium frequency base station 16 and a service of each UE. The measurement information includes information such as a load status and channel state information of the low and medium frequency base station 16, a quantity of UEs served by the low and medium frequency base station 16, and an ID of the UE.

Before receiving the allocation result sent by the high frequency base station, the transceiver 161 is further configured to:

send a capacity of a first backhaul of the low and medium frequency base station 16 to the high frequency base station, where the first backhaul is provided by the low and medium frequency base station 16, and connects the low and medium frequency base station 16 and the high frequency base station; or send a percentage that is accounted for by the low and medium frequency base station 16 and that is of a second backhaul of the high frequency base station to the high frequency base station, where the second backhaul is provided by the high frequency base station and connects the low and medium frequency base station 16 and the high frequency base station.

Optionally, the transceiver 161 is specifically configured to:

receive one-bit signaling that is sent by the high frequency base station by using an X2 interface or S1 interface and that carries the allocation result; determine, based on the one-bit signaling, whether to use one or more CCs included in the high frequency resources; and forward the one-bit signaling carrying the allocation result to the UE, so that the UE determines, according to the one-bit signaling, whether to receive signaling or a downlink data packet that is sent by the high frequency base station and that carries the allocation result, where the signaling and the downlink data packet are used to indicate a frequency band of a CC used by the UE in the high frequency resources.

Optionally, the transceiver 161 is specifically configured to:

receive multi-bit signaling that is sent by the high frequency base station by using an X2 interface or S1 interface and that carries the allocation result; determine a frequency band range of a used CC in the high frequency resources based on the multi-bit signaling: allocate a frequency band of a used CC in the frequency band range to the UE based on the determined frequency band range; and notify the frequency band of the used CC in the frequency band range to the UE.

When notifying the frequency band of the used CC in the frequency band range to the UE, the transceiver 161 is specifically configured to:

notify the frequency band of the used CC in the frequency band range to the UE by using signaling; or notify the frequency band of the used CC in the frequency band range to the UE by using a downlink data packet.

When notifying the frequency band of the used CC in the frequency band range to the UE by using the downlink data packet, the transceiver 161 is specifically configured to:

fill a MAC mapping table according to information about the frequency band that is allocated to the UE and that is of the used CC in the frequency band range; add the MAC mapping table to MAC information in the downlink data packet; and send the downlink data packet to the UE by using a PDSCH.

Embodiment 13

Figure 17:
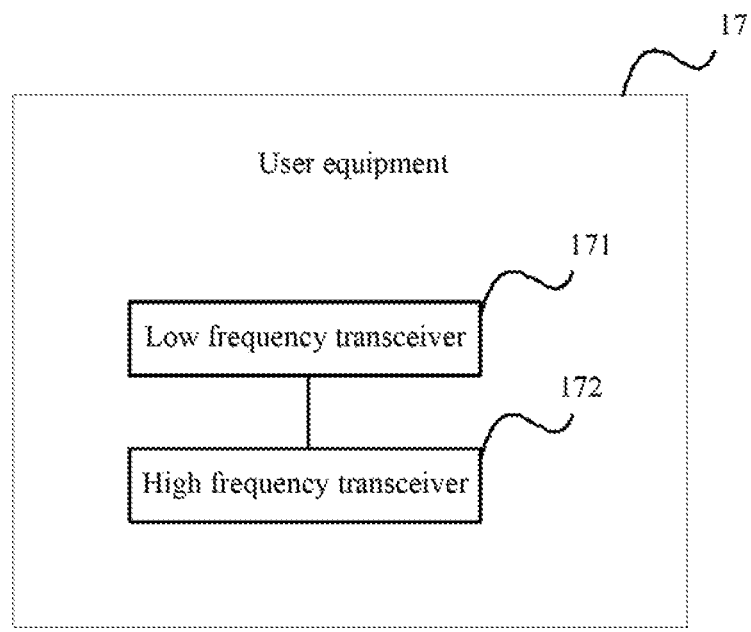
FIG. 17 is a schematic structural diagram of UE according to an embodiment of the present invention.

Referring to FIG. 17, this embodiment of the present invention provides UE 17, including:

a low frequency transceiver 171, configured to: send a measurement report to a low and medium frequency base station of any one of multiple telecommunications operators, where the low and medium frequency base station works in a low and medium frequency band; and receive an allocation result sent by the low and medium frequency base station, where the allocation result is obtained by the low and medium frequency base station after the low and medium frequency base station allocates multiple CCs included in high frequency resources to the UE 17 according to the measurement report; and a high frequency transceiver 172, configured to: send the measurement report to a high frequency base station, where the high frequency base station works in a high frequency band; and receive an allocation result sent by the high frequency base station, where the allocation result is obtained by the high frequency base station after the high frequency base station allocates the multiple CCs included in the high frequency resources to the UE 17 according to the measurement report.

When receiving the allocation result sent by the high frequency base station or the low and medium frequency base station, the high frequency transceiver 172 is specifically configured to: when the low frequency transceiver 171 receives one-bit signaling that is forwarded by the low and medium frequency base station and that carries the allocation result, and determines, according to the one-bit signaling, to receive signaling or a downlink data packet that is sent by the high frequency base station and that carries the allocation result, receive the signaling or downlink data packet, where the signaling and downlink data packet are used to indicate a frequency band of a CC used by the UE 17 in the high frequency resources; or receive broadcast information that is sent by the high frequency base station by using a PBCH and that carries the allocation result, and the low frequency transceiver 171 is specifically configured to receive signaling or a downlink data packet that is sent by the low and medium frequency base station and that carries the allocation result, where the signaling and downlink data packet are used to indicate a frequency band of a CC used by the UE in the high frequency resources.

Further, the high frequency transceiver 172 is further configured to communicate with the high frequency base station based on the frequency band of the CC indicated in the allocation result.

To sum up, the technical solutions provided in the embodiments of the present invention may be applied to a hotspot area. A high frequency base station is deployed, to provide signaling support and a data offloading service for UEs covered by low and medium frequency base stations, thereby improving QoS of the UEs and reducing costs of deploying, by multiple telecommunications operators, base stations and backhauls.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for allocating multiple component carriers, comprising:
    receiving, by a high frequency base station, measurement information sent by low and medium frequency base stations of multiple telecommunications operators or measurement reports sent by first user equipments of multiple telecommunications operators, wherein the high frequency base station works in a high frequency band, the low and medium frequency base stations work in a low and medium frequency band, and the first user equipments are served by the high frequency base station;
    allocating, by the high frequency base station according to the measurement information or the measurement reports, multiple component carriers comprised in high frequency resources to the low and medium frequency base stations or the first user equipments, to obtain an allocation result; and
    notifying, by the high frequency base station, the allocation result to the low and medium frequency base stations or the first user equipments.

2. The method according to claim 1, wherein before the allocating, by the high frequency base station according to the measurement information, multiple component carriers comprised in high frequency resources to the low and medium frequency base stations, the method further comprises:
    receiving, by the high frequency base station, capacities that are sent by the low and medium frequency base stations and that are of first backhaul links of the low and medium frequency base stations, wherein the first backhaul links are provided by the low and medium frequency base stations and connect the high frequency base station and the low and medium frequency base stations; and
    the allocating, by the high frequency base station according to the measurement information, multiple component carriers comprised in high frequency resources, to obtain an allocation result comprises:
    allocating, by the high frequency base station according to the measurement information and the capacities of the first backhaul links, the multiple component carriers comprised in the high frequency resources, to obtain the allocation result.

3. The method according to claim 1, wherein before the allocating, by the high frequency base station according to the measurement information, multiple component carriers comprised in high frequency resources to the low and medium frequency base stations, the method further comprises:
- receiving, by the high frequency base station, percentages that are sent by the low and medium frequency base stations, that are accounted for by the low and medium frequency base stations, and that are of a second backhaul link of the high frequency base station, wherein the second backhaul link is provided by the high frequency base station and connects the high frequency base station and the low and medium frequency base stations; and
- the allocating, by the high frequency base station according to the measurement information, multiple component carriers comprised in high frequency resources, to obtain an allocation result comprises:
- allocating, by the high frequency base station according to the measurement information and the percentages that are accounted for by the low and medium frequency base stations and that are of the second backhaul link, the multiple component carriers comprised in the high frequency resources, to obtain the allocation result.

4. The method according to claim 1, wherein the allocating, by the high frequency base station according to the measurement information or the measurement reports, multiple component carriers comprised in high frequency resources to the low and medium frequency base stations or the first user equipments comprises:
- allocating, by the high frequency base station, frequency band ranges of used component carriers in the high frequency resources to the low and medium frequency base stations according to the measurement information; or
- allocating, by the high frequency base station, frequency bands of used component carriers in the high frequency resources to the first user equipments according to the measurement reports.

5. The method according to claim 4, wherein after the allocating, by the high frequency base station, frequency band ranges of used component carriers in the high frequency resources to the low and medium frequency base stations according to the measurement information, the method further comprises:
- allocating, by the high frequency base station, frequency bands of used component carriers in the frequency band ranges to second user equipments served by the low and medium frequency base stations.

6. The method according to claim 1, wherein the notifying, by the high frequency base station, the allocation result to the low and medium frequency base stations comprises:
- sending, by the high frequency base station, one-bit signaling by using an X2 interface or S1 interface, to notify the allocation result to the low and medium frequency base stations, wherein the one-bit signaling is used to notify the low and medium frequency base stations whether to use component carriers comprised in the high frequency resources; or
- sending, by the high frequency base station, multi-bit signaling by using an X2 interface or S1 interface, to notify the allocation result to the low and medium frequency base stations, wherein the multi-bit signaling is used to notify the frequency band ranges of the used component carriers in the high frequency resources to the low and medium frequency base stations.

7. A method for allocating multiple component carriers, comprising:
- receiving, by low and medium frequency base stations of multiple telecommunications operators, measurement reports sent by user equipments served by the low and medium frequency base stations, wherein the low and medium frequency base stations work in a low and medium frequency band;
- obtaining, by the low and medium frequency base stations, measurement information according to the measurement reports and network load statuses of the low and medium frequency base stations;
- sending, by the low and medium frequency base stations, the measurement information to a high frequency base station, wherein the high frequency base station works in a high frequency band;
- receiving, by the low and medium frequency base stations, an allocation result sent by the high frequency base station, wherein the allocation result is obtained by the high frequency base station after the high frequency base station allocates multiple component carriers comprised in high frequency resources to the low and medium frequency base stations according to the measurement information; and
- notifying, by the low and medium frequency base stations, the allocation result to the user equipments.

8. The method according to claim 7, wherein before the receiving, by the low and medium frequency base stations, an allocation result sent by the high frequency base station, the method further comprises:
- sending, by the low and medium frequency base stations, capacities of first backhaul links of the low and medium frequency base stations to the high frequency base station, wherein the first backhaul links are provided by the low and medium frequency base stations and connect the low and medium frequency base stations and the high frequency base station; or
- sending, by the low and medium frequency base stations, percentages that are accounted for by the low and medium frequency base stations and that are of a second backhaul link of the high frequency base station to the high frequency base station, wherein the second backhaul link is provided by the high frequency base station and connects the low and medium frequency base stations and the high frequency base station.

9. The method according to claim 7, wherein the receiving, by the low and medium frequency base stations, an allocation result sent by the high frequency base station comprises:
- receiving, by the low and medium frequency base stations, one-bit signaling that is sent by the high frequency base station by using an X2 interface or S1 interface and that carries the allocation result; and
- determining, by the low and medium frequency base stations based on the one-bit signaling, whether to use component carriers comprised in the high frequency resources; and
- the notifying, by the low and medium frequency base stations, the allocation result to the user equipments comprises:
- forwarding, by the low and medium frequency base stations, the one-bit signaling carrying the allocation result to the user equipments, so that the user equipments determine, according to the one-bit signaling, whether to receive signaling or downlink data packets that is or are sent by the high frequency base station and that carries or carry the allocation result, wherein the signaling and downlink data packets are used to indicate frequency bands of component carriers used by the user equipments in the high frequency resources.

10. The method according to claim 7, wherein the receiving, by the low and medium frequency base stations, an allocation result sent by the high frequency base station comprises:
  receiving, by the low and medium frequency base stations, multi-bit signaling that is sent by the high frequency base station by using an X2 interface or S1 interface and that carries the allocation result; and
  determining, by the low and medium frequency base stations, frequency band ranges of used component carriers in the high frequency resources based on the multi-bit signaling; and
  the notifying, by the low and medium frequency base stations, the allocation result to the user equipments comprises:
  allocating, by the low and medium frequency base stations, frequency bands of used component carriers in the frequency band ranges to the user equipments based on the determined frequency band ranges; and
  notifying, by the low and medium frequency base stations, the frequency bands of the used component carriers in the frequency band ranges to the user equipments.

11. A method for allocating multiple component carriers, comprising:
  sending, by user equipments, measurement reports to a high frequency base station or to low and medium frequency base stations of multiple telecommunications operators, wherein the high frequency base station works in a high frequency band, and the low and medium frequency base stations work in a low and medium frequency band; and
  receiving, by the user equipments, an allocation result sent by the high frequency base station or the low and medium frequency base stations, wherein the allocation result is obtained by the high frequency base station or the low and medium frequency base stations after the high frequency base station allocates or the low and medium frequency base stations allocate multiple component carriers comprised in high frequency resources to the user equipments according to the measurement reports.

12. The method according to claim 11, wherein the receiving, by the user equipments, an allocation result sent by the high frequency base station or the low and medium frequency base stations comprises:
  when receiving one-bit signaling that is forwarded by the low and medium frequency base stations and that carries the allocation result, and determining, according to the one-bit signaling, to receive signaling or downlink data packets that is or are sent by the high frequency base station and that carries or carry the allocation result, receiving, by the user equipments, the signaling or downlink data packets, wherein the signaling and downlink data packets are used to indicate frequency bands of component carriers used by the user equipments in the high frequency resources; or
  receiving, by the user equipments, signaling or downlink data packets that is or are sent by the low and medium frequency base stations and that carries or carry the allocation result, wherein the signaling and downlink data packets are used to indicate frequency bands of component carriers used by the user equipments in the high frequency resources; or
  receiving, by the user equipments, broadcast information that is sent by the high frequency base station by using a physical broadcast channel PBCH and that carries the allocation result.

13. The method according to claim 11, wherein after the receiving, by the user equipments, an allocation result sent by the high frequency base station or the low and medium frequency base stations, the method further comprises:
  communicating, by the user equipments, with the high frequency base station based on the frequency bands of the component carriers indicated in the allocation result.

14. A high frequency base station, wherein the high frequency base station works in a high frequency band, and the high frequency base station comprises:
  a transceiver, configured to receive measurement information sent by low and medium frequency base stations of multiple telecommunications operators or measurement reports sent by first user equipments of multiple telecommunications operators, wherein the low and medium frequency base stations work in a low and medium frequency band, and the first user equipments are served by the high frequency base station; and
  a controller, configured to allocate, according to the measurement information or the measurement reports, multiple component carriers comprised in high frequency resources to the low and medium frequency base stations or the first user equipments, to obtain an allocation result, wherein
  the transceiver is further configured to notify the allocation result to the low and medium frequency base stations or the first user equipments.

15. The high frequency base station according to claim 14, wherein before the controller allocates, according to the measurement information, the multiple component carriers comprised in the high frequency resources to the low and medium frequency base stations, the transceiver is further configured to:
  receive capacities that are sent by the low and medium frequency base stations and that are of first backhaul links of the low and medium frequency base stations, wherein the first backhaul links are provided by the low and medium frequency base stations and connect the high frequency base station and the low and medium frequency base stations; and
  the controller is configured to:
  allocate, according to the measurement information and the capacities of the first backhaul links, the multiple component carriers comprised in the high frequency resources, to obtain the allocation result.

16. The high frequency base station according to claim 14, wherein before the controller allocates, according to the measurement information, the multiple component carriers comprised in the high frequency resources to the low and medium frequency base stations, the transceiver is further configured to:
  receive percentages that are sent by the low and medium frequency base stations, that are accounted for by the low and medium frequency base stations, and that are of a second backhaul link of the high frequency base station, wherein the second backhaul link is provided by the high frequency base station and connects the high frequency base station and the low and medium frequency base stations; and the controller is configured to:
allocate, according to the measurement information and the percentages that are accounted for by the low and medium frequency base stations and that are of the second backhaul link, the multiple component carriers comprised in the high frequency resources, to obtain the allocation result.

17. The high frequency base station according to claim 14, wherein the controller is configured to:
allocate frequency band ranges of used component carriers in the high frequency resources to the low and medium frequency base stations according to the measurement information; or
allocate frequency bands of used component carriers in the high frequency resources to the first user equipments according to the measurement reports.

18. The high frequency base station according to claim 17, wherein after allocating the frequency band ranges of the used component carriers in the high frequency resources to the low and medium frequency base stations, the controller is further configured to:
allocate frequency bands of used component carriers in the frequency band ranges to second user equipments served by the low and medium frequency base stations.

19. The high frequency base station according to claim 14, wherein when notifying the allocation result to the low and medium frequency base stations, the transceiver is configured to:
send one-bit signaling by using an X2 interface or S1 interface, to notify the allocation result to the low and medium frequency base stations, wherein the one-bit signaling is used to notify the low and medium frequency base stations whether to use component carriers comprised in the high frequency resources; or
send multi-bit signaling by using an X2 interface or S1 interface, to notify the allocation result to the low and medium frequency base stations, wherein the multi-bit signaling is used to notify the frequency band ranges of the used component carriers in the high frequency resources to the low and medium frequency base stations.

20. The high frequency base station according to claim 19, wherein after sending the one-bit signaling to notify the allocation result to the low and medium frequency base stations, the transceiver is further configured to:
notify, by using signaling or downlink data packets, the allocation result to the second user equipments served by the low and medium frequency base stations, wherein the signaling and downlink data packets are used to indicate the frequency bands of the component carriers used by the second user equipments in the high frequency resources.

21. The high frequency base station according to claim 20, wherein when notifying, by using the downlink data packets, the allocation result to the second user equipments served by the low and medium frequency base stations, the transceiver is configured to:
fill a Media Access Control (MAC) mapping table according to the allocation result;
add the MAC mapping table to MAC information in the downlink data packets; and
send the downlink data packets to the second user equipments by using a physical data shared channel PDSCH.

22. A low and medium frequency base station, wherein the low and medium frequency base station belongs to any one of multiple telecommunications operators, and works in a low and medium frequency band, and the low and medium frequency base station comprises:
a transceiver, configured to receive a measurement report sent by user equipment served by the low and medium frequency base station; and
a processor, configured to obtain measurement information according to the measurement report and a network load status of the low and medium frequency base station, wherein
the transceiver is further configured to: send the measurement information to a high frequency base station, wherein the high frequency base station works in a high frequency; receive an allocation result sent by the high frequency base station, wherein the allocation result is obtained by the high frequency base station after the high frequency base station allocates multiple component carriers comprised in high frequency resources to the low and medium frequency base station according to the measurement information; and notify the allocation result to the user equipment.

23. The low and medium frequency base station according to claim 22, wherein before receiving the allocation result sent by the high frequency base station, the transceiver is further configured to:
send a capacity of a first backhaul link of the low and medium frequency base station to the high frequency base station, wherein the first backhaul link is provided by the low and medium frequency base station and connects the low and medium frequency base station and the high frequency base station; and
send a percentage that is accounted for by the low and medium frequency base station and that is of a second backhaul link of the high frequency base station to the high frequency base station, wherein the second backhaul link is provided by the high frequency base station and connects the low and medium frequency base station and the high frequency base station.

24. The low and medium frequency base station according to claim 22, wherein the transceiver is configured to:
receive one-bit signaling that is sent by the high frequency base station by using an X2 interface or S1 interface and that carries the allocation result;
determine, based on the one-bit signaling, whether to use a component carrier comprised in the high frequency resources; and
forward the one-bit signaling carrying the allocation result to the user equipment, so that the user equipment determines, according to the one-bit signaling, whether to receive signaling or a downlink data packet that is sent by the high frequency base station and that carries the allocation result, wherein the signaling and downlink data packet are used to indicate a frequency band of a component carrier used by the user equipment in the high frequency resources.

25. User equipment, comprising:
a low frequency transceiver, configured to: send a measurement report to a low and medium frequency base station of any one of multiple telecommunications operators, wherein the low and medium frequency base station works in a low and medium frequency band; and receive an allocation result sent by the low and medium frequency base station, wherein the allocation result is obtained by the low and medium frequency base station after the low and medium frequency base station allocates multiple component carriers comprised in high frequency resources to the user equipment according to the measurement report; and a high frequency transceiver, configured to: send the measurement report to a high frequency base station, wherein the high frequency base station works in a high frequency band; and receive an allocation result sent by the high frequency base station, wherein the allocation result is obtained by the high frequency base station after the high frequency base station allocates the multiple component carriers comprised in the high frequency resources to the user equipment according to the measurement report.

26. The user equipment according to claim 25, wherein when receiving the allocation result sent by the high frequency base station or the low and medium frequency base station, the high frequency transceiver is configured to:
when the low frequency transceiver receives one-bit signaling that is forwarded by the low and medium frequency base station and that carries the allocation result and determines, according to the one-bit signaling, to receive signaling or a downlink data packet that is sent by the high frequency base station and that carries the allocation result, receive the signaling or downlink data packet sent by the high frequency base station, wherein the signaling and downlink data packet are used to indicate a frequency band of a component carrier used by the user equipment in the high frequency resources; or receive broadcast information that is sent by the high frequency base station by using a physical broadcast channel PBCH and that carries the allocation result; and the low frequency transceiver is specifically configured to:

receive signaling or a downlink data packet that is sent by the low and medium frequency base station and that carries the allocation result, wherein the signaling and downlink data packet are used to indicate the frequency band of the component carrier used by the user equipment in the high frequency resources.

* * * * *